US009904142B2

(12) United States Patent
Shiota

(10) Patent No.: US 9,904,142 B2
(45) Date of Patent: Feb. 27, 2018

(54) LIGHT-MODULATING ELEMENT AND SMART GLASS

(71) Applicant: NLT TECHNOLOGIES, LTD., Kawasaki, Kanagawa (JP)

(72) Inventor: Kunihiro Shiota, Kanagawa (JP)

(73) Assignee: NLT TECHNOLOGIES, LTD., Kawasaki, Kanagawa (JP)

( * ) Notice: Subject to any disclaimer, the term of this patent is extended or adjusted under 35 U.S.C. 154(b) by 0 days.

(21) Appl. No.: 15/126,785

(22) PCT Filed: Mar. 18, 2015

(86) PCT No.: PCT/JP2015/058108
§ 371 (c)(1),
(2) Date: Sep. 16, 2016

(87) PCT Pub. No.: WO2015/141740
PCT Pub. Date: Sep. 24, 2015

(65) Prior Publication Data

US 2017/0097554 A1 Apr. 6, 2017

(30) Foreign Application Priority Data

Mar. 18, 2014 (JP) ................................ 2014-054761

(51) Int. Cl.
*G02B 26/00* (2006.01)
*G02F 1/167* (2006.01)
(Continued)

(52) U.S. Cl.
CPC ............ *G02F 1/167* (2013.01); *G02F 1/1339* (2013.01); *G02F 1/13306* (2013.01);
(Continued)

(58) Field of Classification Search
CPC . G02B 26/026; G02F 1/167; G02F 1/134363; G02F 1/133377;
(Continued)

(56) References Cited

U.S. PATENT DOCUMENTS 6,512,626 B1 1/2003 Schmidt
6,738,039 B2 * 5/2004 Goden .................... G02F 1/167 345/107

(Continued)

FOREIGN PATENT DOCUMENTS

JP 59-191017 A 10/1984
JP 3-86328 U 8/1991

(Continued)

OTHER PUBLICATIONS

International Search Report for PCT/JP2015/058108 dated Jun. 2, 2015.

*Primary Examiner* — Mahidere Sahle
(74) *Attorney, Agent, or Firm* — Sughrue Mion, PLLC

(57) ABSTRACT

A light-modulating element comprises: first and second transparent substrates arranged in opposition to one another; a first transparent electrode arranged on the opposition surface of the first transparent substrate; a plurality of light transmissive regions arranged between the first transparent electrode and the second transparent substrate so as to be separated from one another; a plurality of second transparent electrodes arranged at respective positions on the second transparent substrate opposing the respective light transmissive regions, and that are arranged so as to be separated by a given distance from the respective light transmissive regions; a plurality of third transparent electrodes arranged individually between the second transparent electrodes at a predetermined distance therefrom on the second transparent substrate side; and an electrophoretic member arranged within a gap formed between the first transparent substrate
(Continued)

and the second transparent substrate, and that includes light-shielding electrophoretic particles.

12 Claims, 37 Drawing Sheets

(51) Int. Cl.

| | |
|---|---|
| ***G02F 1/133*** | (2006.01) |
| ***G02F 1/1333*** | (2006.01) |
| ***G02F 1/1335*** | (2006.01) |
| ***G02F 1/1339*** | (2006.01) |

(52) U.S. Cl.
CPC .. *G02F 1/133345* (2013.01); *G02F 1/133512* (2013.01); *G02F 2001/1676* (2013.01); *G02F 2203/01* (2013.01); *G02F 2203/48* (2013.01)

(58) Field of Classification Search
CPC .. G02F 1/134336; G02F 1/172; G02F 1/1362; G02F 2001/1672; G02F 2001/1676
USPC .................................................. 359/295–298
See application file for complete search history.

(56) References Cited

U.S. PATENT DOCUMENTS

| | | | |
|---|---|---|---|
| 7,751,667 | B2 | 7/2010 | Daniel et al. |
| 2002/0008898 | A1 | 1/2002 | Katase |
| 2012/0069426 | A1* | 3/2012 | Lee ...................... G02B 26/026 359/296 |
| 2013/0033741 | A1 | 2/2013 | Mori et al. |
| 2014/0185129 | A1* | 7/2014 | Kim .................... H01L 51/5284 359/296 |
| 2015/0219978 | A1* | 8/2015 | Moriwaki ............... G02F 1/167 359/296 |

FOREIGN PATENT DOCUMENTS

| | | | |
|---|---|---|---|
| JP | 2001-343672 | A | 12/2001 |
| JP | 2003-502696 | A | 1/2003 |
| JP | 3399967 | B2 | 4/2003 |
| JP | 2009-98480 | A | 5/2009 |
| JP | 2013-33074 | A | 2/2013 |

* cited by examiner 11
22
51
52
50
40
31
21
33
32
h1

FIG.18A
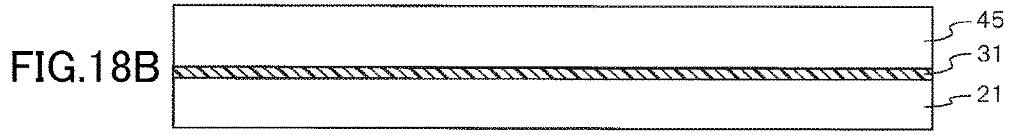
FIG.18B
FIG.18C
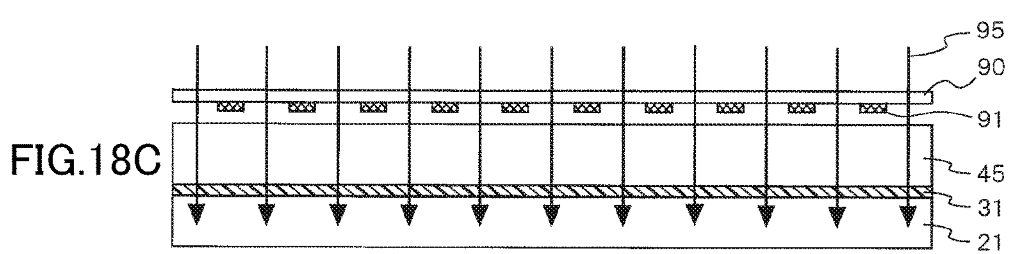
FIG.18D
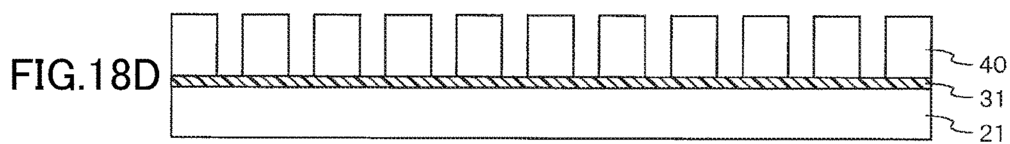
FIG.18E
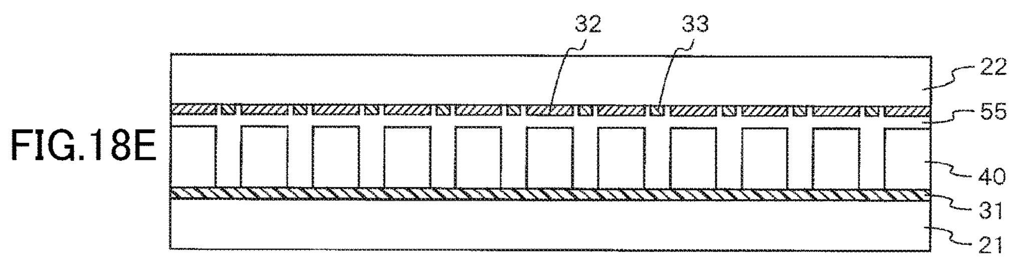
FIG.18F
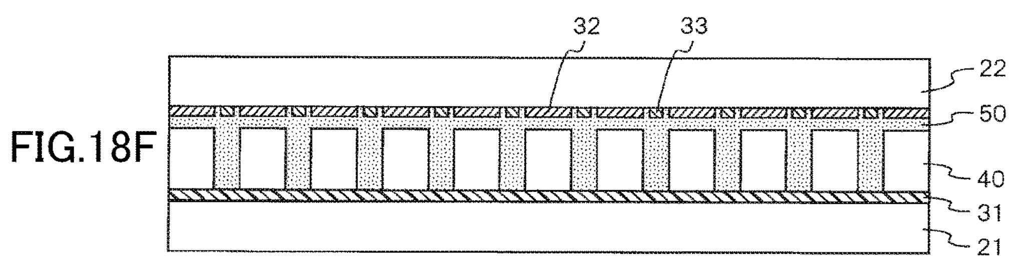

11
22
56
40
50
51
52
31
21
56
55
33
32
56
h1

13
22
55
40
50
51
52
31
21
62
33
32
h2

38
21

45
38
21

95
21
38
45

40
38
21

32
33
22
55
40
38
21

32
33
22
50
40
38
21

LIGHT-MODULATING ELEMENT AND SMART GLASS

CROSS REFERENCE TO RELATED APPLICATIONS

This application is a National Stage of International Application No. PCT/JP2015/058108 filed Mar. 18, 2015, claiming priority based on Japanese Patent Application No. 2014-054761 filed Mar. 18, 2014, the contents of all of which are incorporated herein by reference in their entirety.

TECHNICAL FIELD

The present invention relates to a light-modulating element which controls the emission state of transmitted light and to a smart glass to which the same is loaded.

BACKGROUND ART

Recently, due to an increase in the awareness about ecology, there is an increasing demand for a smart glass with a built-in light-modulating function which modulates the light shining into the inside of rooms and the like.

For the smart glass contributing to improving the air-conditioning energy efficiency, an electrochromic element exhibiting a function of switching a transparent state and a light-shielding state (nontransparent state) is used. Through controlling the influence of natural light to decrease the air-conditioning load by the light-modulating function regarding the switching of the states, the electric power use amount is reduced.

As an example of the practical use of the glass to which the electrochromic element is built-in, the technical content disclosed in Patent Document 1 or 2, for example, is known.

Patent Document 1 discloses a window glass capable of switching a transparent state and a light-shielding state through changing the voltage to be applied to two transparent electrodes disposed in opposition to one another via a variable member (an electrochromic element).

The electrochromic window glass disclosed in Patent Document 2 employs a structure in which two glass plates on which a transparent conductive film and a film of an electrochromic material are coated in this order are disposed with each of the film sides being opposed to each other and the two glass plates are isolated from each other via an electrolyte and a counter electrode. The electrochromic window glass can be employed as windows of buildings and automobiles, which makes it possible to control the amount of solar heat captured into the inside thereof by the effect of the electric field for the counter electrode.

In the meantime, there has been an increasing demand for being able to arbitrarily achieve a state where the viewing field for the front direction is maintained while shielding the light of the other directions. For example, there is a demand for making it possible to shield the light that makes incident from the upper oblique directions such as the sunlight while maintaining the visibility from outside or inside.

As a technique for satisfying such demand, proposed is a light-ray direction control element that is provided with a light-modulating function which switches the visible range of a display between a wide viewing field mode (a state where visual recognition can be achieved in a wide range) and a narrow viewing field mode (a state where visual recognition can be achieved only in a narrow range).

As such light-ray direction control element, there is a light-ray direction control element 210 that employs the structure in which: a light transmissive regions 240 are formed by exposing, developing, and heating a transparent photosensitive resin layer by using two transparent substrates 221 and 222 disposed in opposition to one another as in a sectional view shown in FIG. 29, for example; and an electrophoretic element 250 is disposed between the light transmissive regions 240. In this case, transparent conductive films 231 and 232 are formed, respectively, between each of the transparent substrates 221, 222 and the light transmissive regions 240.

As described, in the light-ray direction control element 210 where the electrophoretic element 250 is disposed between the light transmissive regions 240 of a high aspect ratio arranged two-dimensionally independently on the transparent substrate 221, the emission state of light (incident light) 450 is switched by arbitrarily achieving the narrow viewing field mode shown in FIG. 29A and the wide viewing field mode shown in FIG. 29B through controlling the dispersion state of the electrophoretic element 250 with the electric field applied from outside via the transparent conductive films 231 and 232.

Further, as another structural example capable of such switching processing, a light-ray direction control element disclosed in Patent Document 3 is known. That is, as in a sectional view shown in FIG. 30, a light-ray direction control element 310 includes: a transparent substrate 321; a transparent conductive film 331 formed on the surface of the transparent substrate 321; a plurality of light transmissive regions 340 formed to be isolated from each other on a top surface 331*a* of the transparent conductive film 331; electrophoretic elements 350 disposed between each of the light transmissive regions 340; and another transparent substrate 322 that includes another transparent conductive film 332 on a face opposing to each of the light transmissive regions 340.

Patent Document 1: Japanese Unexamined Patent Publication Sho 59-191017

Patent Document 2: Japanese Patent No. 3399967

Patent Document 3: U.S. Pat. No. 7,751,667

However, the light-modulating functions disclosed in Patent Document 1 and Patent Document 2 are the techniques for achieving only the two kinds of the states that are the transparent state and the light-shielding state. Especially in the light-shielding state, the entire surface of the glass is equally light-shielded so that the visibility through the glass becomes deteriorated.

Further, when the optical density at the time of shielding the light is set to be low in order to minimize the deterioration in the visibility in the light-shielding state, the light-shielding effect by the light-modulating function cannot be acquired sufficiently.

In addition, even though the light-modulating function disclosed in Patent Document 3 can achieve a wide visible range state or a narrow visible range state at arbitrary timing, at least the front viewing field is maintained. That is, the entire surface of the substrate cannot be light-shielded, so that the complete light-shielding characteristic cannot be secured.

The present invention is designed in view of such shortcomings of the above-described related techniques. It is particularly an object of the present invention to provide a light-modulating element capable of effectively adjusting and controlling the transmission state of the transmitted light in accordance with the demand and the changes in the use environment and provide a smart glass on which the same is loaded.

DISCLOSURE OF THE INVENTION

In order to achieve the foregoing object, the light-modulating element according to the present invention employs a structure which includes: a first transparent substrate; a second transparent substrate counter-disposed at a position distant from the first transparent substrate; a first transparent electrode disposed on a surface of the first transparent substrate opposing to the second transparent substrate; and a plurality of light transmissive regions disposed to be isolated from each other between the first transparent electrode and the second transparent substrate, and the light-modulating element also includes: a plurality of second transparent electrodes disposed on the second transparent substrate at positions opposing to each of the light transmissive regions with a prescribed distance provided from each of the light transmissive regions; a plurality of third transparent electrodes that are individually disposed between each of the second transparent electrodes on the second transparent substrate side with a prescribed distance provided therebetween; and an electrophoretic member containing light-shielding electrophoretic particles disposed in an air gap formed between each of the second transparent electrodes, each of the third transparent electrodes, and each of the light transmissive regions.

Further, the smart glass according to the present invention employs a structure which includes: a glass exhibiting a light-transmitting characteristic; and the light-modulating element as claimed in any one of claims 1 to 5 disposed on a surface of the glass.

As described above, the present invention is designed to include: in opposition to one another, the first transparent substrate on which the first transparent electrode and a plurality of light transmissive regions isolated from each other are provided and the second transparent substrate on which two kinds of transparent electrodes are provided; and the electrophoretic member disposed in the gap formed therebetween. This makes it possible to provide in particular the light-modulating element that is capable of effectively adjusting and controlling the transmission state of the transmission light in accordance with the demand and the changes in the use environment and provide the smart glass on which the same is loaded.

BRIEF DESCRIPTION OF THE DRAWINGS

FIGS. 6A and 6B show schematic views of the states of the relative potentials between each of the transparent electrodes in the light-modulating element disclosed in FIG. 2, in which FIG. 6A shows the high-density entire surface light-shielding mode of a case where the surface charge of the electrophoretic particles is negative charge (−) and FIG. 6B shows the high-density entire surface light-shielding mode of a case where the surface charge of the electrophoretic particles is positive charge (+);

FIGS. 7A and 7B show schematic views of the states of the relative potentials between each of the transparent electrodes in the light-modulating element disclosed in FIG. 3, in which FIG. 7A shows the narrow viewing field mode of a case where the surface charge of the electrophoretic particles is negative charge (−) and FIG. 7B shows the narrow viewing field mode of a case where the surface charge of the electrophoretic particles is positive charge (+);

FIGS. 8A and 8B show schematic views of the states of the relative potentials between each of the transparent electrodes in the light-modulating element disclosed in FIG. 4, in which FIG. 8A shows the wide viewing field mode of a case where the surface charge of the electrophoretic particles is negative charge (−) and FIG. 8B shows the wide viewing field mode of a case where the surface charge of the electrophoretic particles is positive charge (+);

FIGS. 9A-9D show schematic views of the states of luminance in a light-ray direction control element of the first embodiment, in which FIG. 9A shows the low-density entire surface light-shielding mode, FIG. 9B shows the high-density entire surface light-shielding mode, FIG. 9C shows the narrow viewing field mode, and FIG. 9D shows the wide viewing field mode;

FIGS. 18A-18F show sectional views illustrating the states of each step of a manufacturing method of the light-modulating element disclosed in FIG. 1 in the execution order of FIG. 18A→FIG. 18B→FIG. 18C→FIG. 18D→FIG. 18E→FIG. 18F;

FIGS. 29A and 29B show sectional views showing the operation principle of the light-ray direction control element capable of switching two light emission states, in which FIG. 29A shows the narrow viewing field mode and FIG. 29B shows the wide viewing field mode;

BEST MODES FOR CARRYING OUT THE INVENTION

Figure 1:
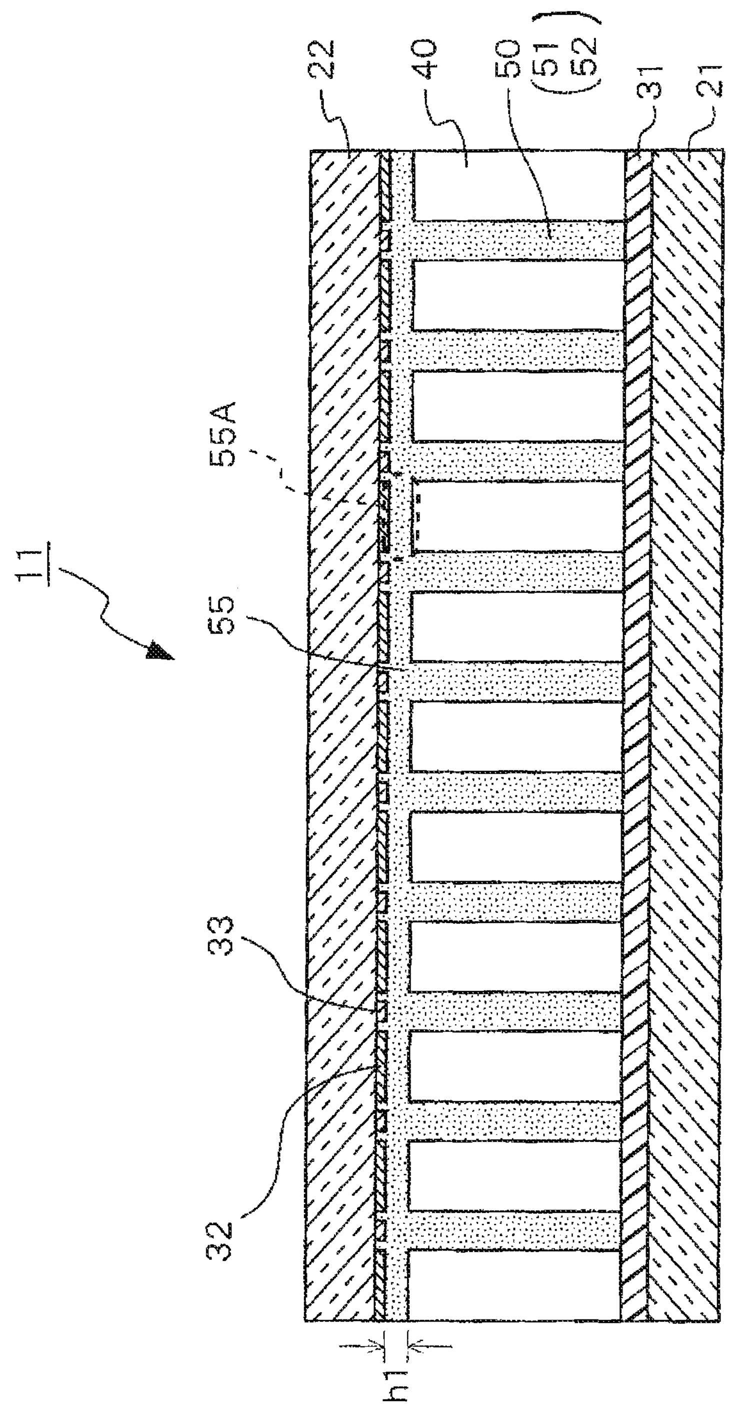
FIG. 1 is a sectional view showing a low-density entire surface light-shielding mode of a light-modulating element according to a first embodiment of the present invention.

Hereinafter, modes for embodying the present invention (referred to as "embodiments" hereinafter) will be described by referring to the accompanying drawings. Note here that same reference numerals are used for the substantially same structural elements in Description and Drawings. Further, regarding the shapes illustrated in the drawings, sizes and ratios thereof are not necessarily consistent with the actual ones.

First Embodiment

A first embodiment of a light-modulating element according to the present invention will be described by referring to FIG. 1 to FIG. 19.

(Basic Structures)

As shown in FIG. 1, a light-modulating element 11 according to the first embodiment includes: a first transparent substrate 21; a first transparent electrode 31 formed on the surface of the first transparent substrate 21; a plurality of light transmissive regions 40 formed to be isolated from each other on the surface of the first transparent electrode 31; a second transparent substrate 22 counter-disposed on the upper side of the light transmissive region 40 by sandwiching an air gap 55A on each of the light transmissive regions 40; a plurality of second transparent electrodes 32 disposed on the second transparent substrate 22 at positions corresponding to each of the light transmissive regions 40; a plurality of third transparent electrodes 33 disposed between each of the second transparent electrodes 32; and an electrophoretic member (electrophoretic element) 50 disposed in the area (air gap 55) other than each of the light transmissive regions 40, each of the second transparent electrodes 32, each of the third transparent electrodes 33, and the first transparent electrode 31 within the region sandwiched between the first transparent substrate 21 and the second transparent substrate 22.

Note here that the electrophoretic member 50 is a mixture of a transmissive dispersant 52 and light-shielding particles 51 to which the surface charge is given.

Further, as shown in FIG. 1, a prescribed isolated distance h1 set in advance is secured between each of the light transmissive regions 40 and the second transparent electrodes. The isolated distance h1 is secured by interposing a spacer 56 (see FIG. 19) as a member for keeping the isolated distance between the light transmissive regions 40 and the second transparent electrodes 32 as will be described later.

As will be described later, it is possible with the light-modulating element 11 to achieve four light-modulating states (operation modes) such as a low-density entire surface light-shielding mode that is a state where the entire surface is light-shielded in low density, a high-density entire surface light-shielding mode that is a state where the entire surface is light-shielded in high density, a narrow viewing field mode that is a state where the front direction thereof is in a light transmissive state and only the oblique directions thereof are light-shielded, and a wide viewing field mode that is a state where a fine light-shielding characteristic is exhibited both in the front and oblique directions.

Figure 5:
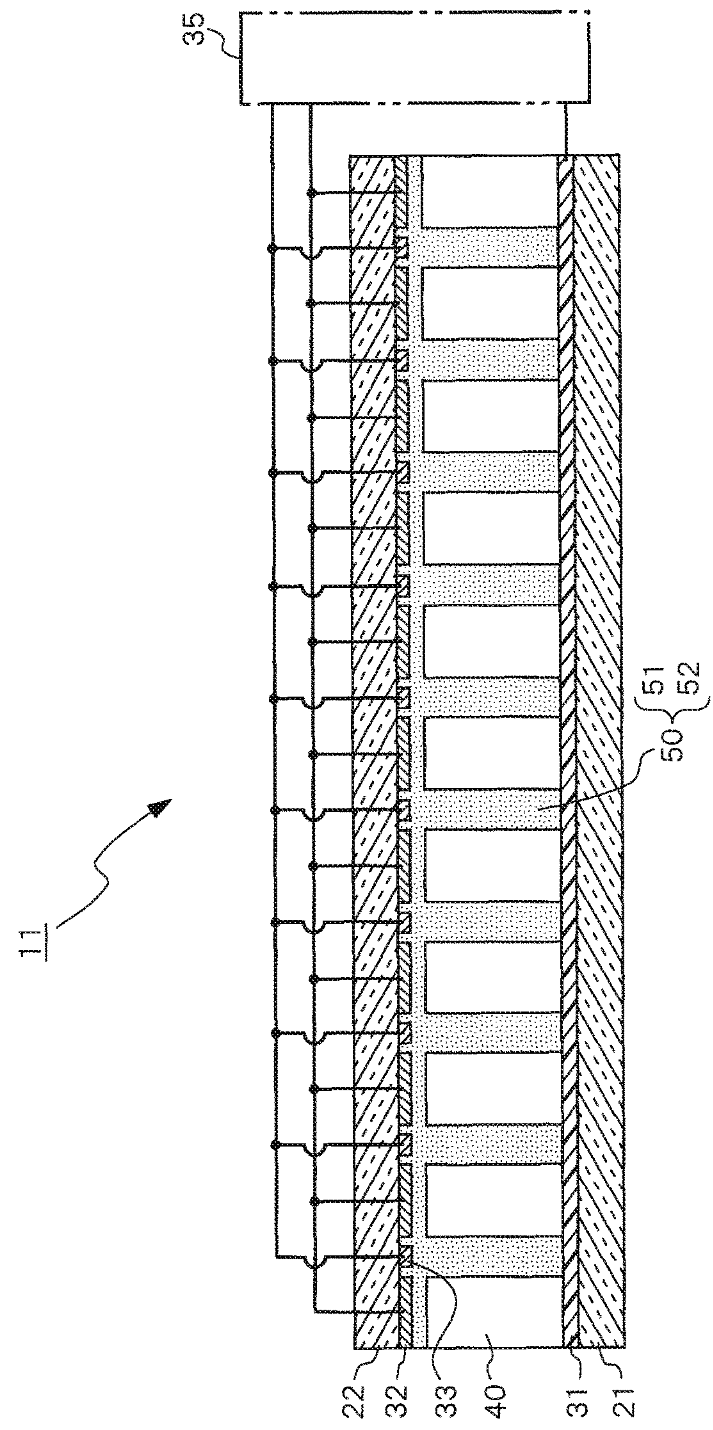
FIG. 5 is a schematic view showing a state of a case where the low-density entire surface light-shielding mode is achieved by setting the potentials between each of the transparent electrodes are all set to be equivalent in the light-modulating element disclosed in FIG. 1.

The low-density entire surface light-shielding mode shown in FIG. 1 is achieved through dispersing the electrophoretic particles 51 within the electrophoretic member 50 in the whole part of the dispersant 52 as also shown in FIG. 5. In this case, the first transparent electrode 31, the second transparent electrodes 32, and the third transparent electrodes 33 are set to be of a same potential.

Note here that the light-modulating element 11 shown in FIG. 5 to FIG. 8 employs a structure which includes an electric field application control module 35 which changes the polarities of each of the transparent electrodes (31, 32, and 33) through adjusting the electric fields to be applied to the first, second, and third transparent electrodes (31, 32, and 33) according to signals from outside.

That is, the electric field application control module 35 may execute switching control of the four operation modes according to the external signals generated by user operations or the like. Further, it is also possible to employ a structure with which a sensor for detecting the degree of the brightness of natural light or the like and switching control of the operation modes is executed as appropriate according to signals from the sensor.

Therefore, for achieving the low-density entire surface light-shielding mode according to the external signals, it is so structured that the electric field application control module 35 sets the first transparent electrode 31, the second transparent electrodes 32, and the third transparent electrodes 33 to be of a same potential to dispose the electrophoretic particles 51 in the whole region within the air gap 55 where the electrophoretic member 50 is disposed.

Figure 9A:
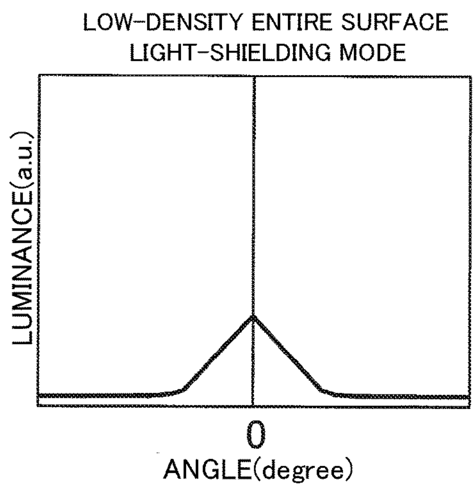

The luminance distribution in the low-density entire surface light-shielding mode is the distribution where the luminance near the front is slightly higher than that of the other angles as shown in FIG. 9A. Therefore, the external appearance appears dim in the front direction and extremely dark in the oblique directions.

Figure 2:
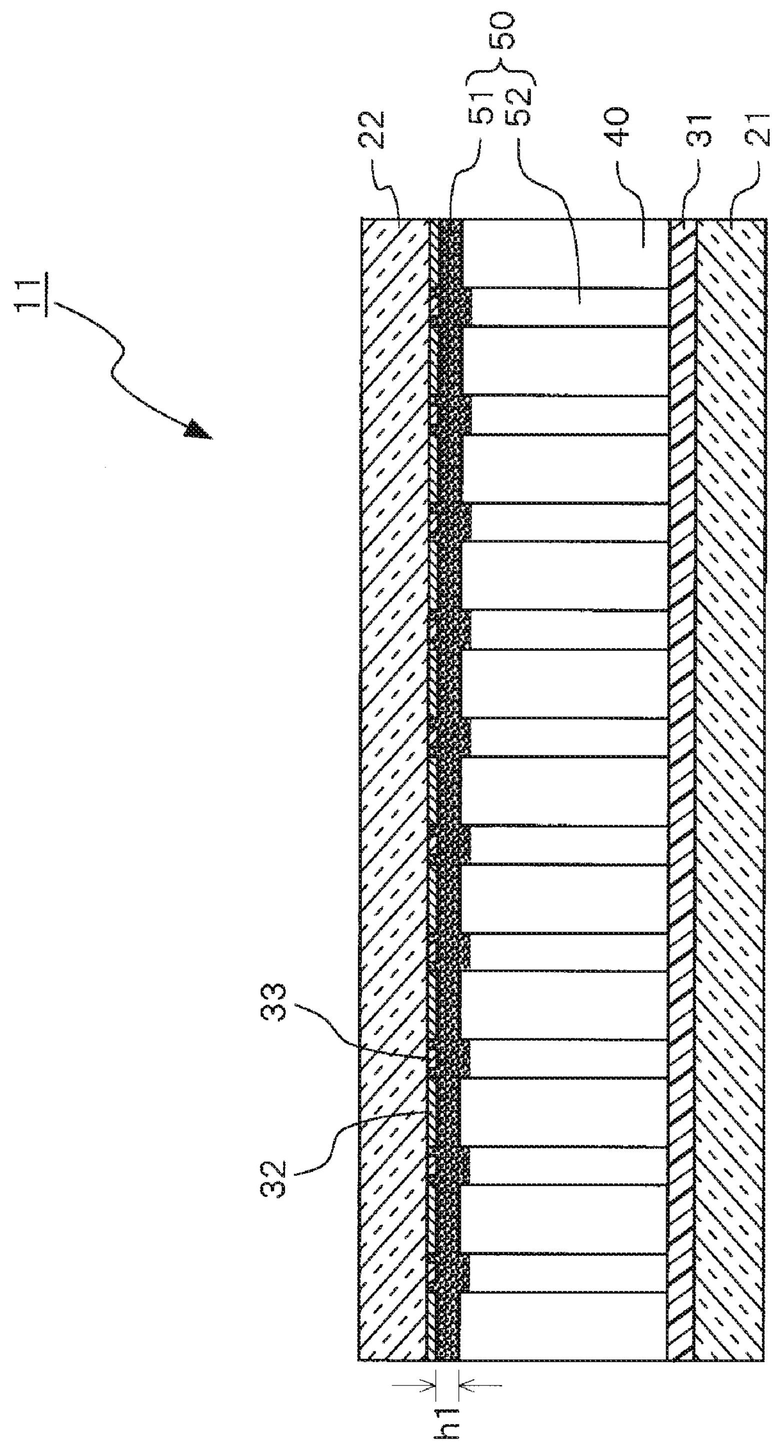
FIG. 2 is a sectional view showing a high-density entire surface light-shielding mode of the light-modulating element according to the first embodiment of the present invention.

The high-density entire surface light-shielding mode shown in FIG. 2 is achieved by gathering the electrophoretic particles 51 in the vicinity of the second transparent electrodes 32 and the third transparent electrodes 33 as also shown in FIG. 6.

At this time, through setting the second transparent electrodes 32 and the third transparent electrodes 33 to be of the same potential and the relative potentials of the second transparent electrode 32 and the third transparent electrodes 33 with respect to the first transparent electrode 31 to be of the opposite polarity from the surface charge of the electrophoretic particles 51, the electrophoretic particles 51 are gathered to the vicinity of the second transparent electrodes 32 and the third transparent electrodes 33.

That is, for achieving the high-density entire surface light-shielding mode according to the external signals, it is so structured that the electric field application control module 35 sets the relative potential of the third transparent electrodes 33 with respect to the first transparent electrode 31 to be of the opposite polarity from that of the surface charge of the electrophoretic particles 51 and sets the second transparent electrodes 32 and the third transparent electrodes 33 to be of the same potential to dispose the electrophoretic particles 51 in the vicinity of the second transparent substrate 22.

Figure 6A:
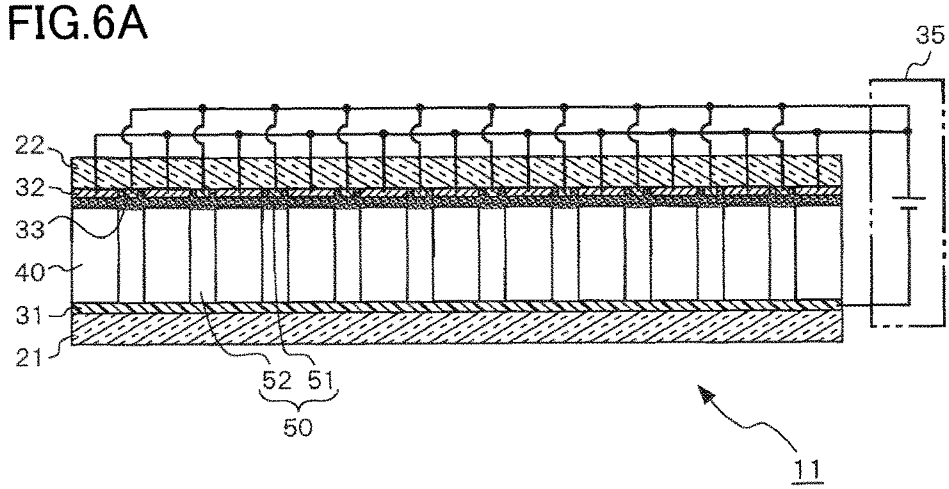
Figure 6B:
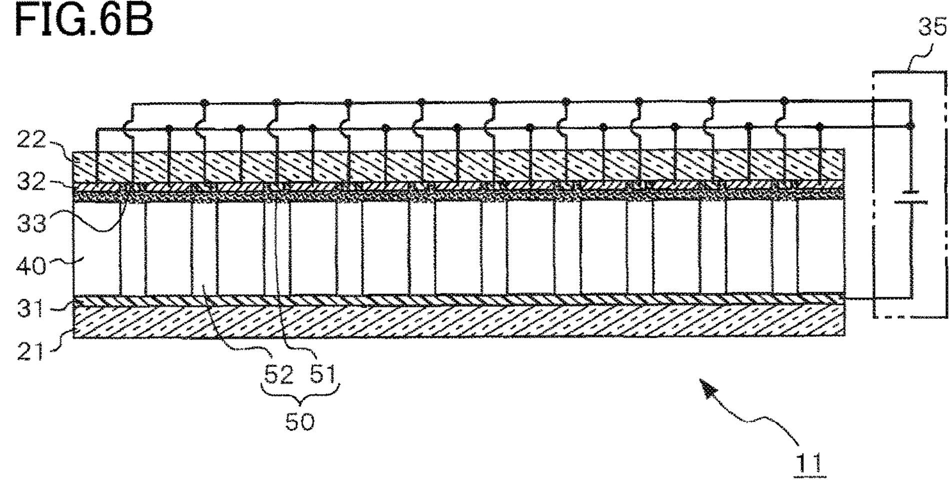

Therefore, in a case where the surface charge of the electrophoretic particles 51 is a negative charge (−), the electric field application control module 35 sets the second transparent electrodes 32 and the third transparent electrodes 33 to be of a positive polarity as shown in FIG. 6A. In a case where the surface charge of the electrophoretic particles 51 is a positive charge (+), the electric field application control module 35 sets the second transparent electrodes 32 and the third transparent electrodes 33 to be of a negative polarity as shown in FIG. 6B.

While FIG. 6 illustrates the polarities of each of the transparent electrodes by using symbols that show typical direct current power source along with a simple circuit structure as the inside structure of the electric field application control module 35, it is simply presented for the sake of explanations. This is also the same in FIG. 7 and FIG. 8 to be described later.

Figure 9B:
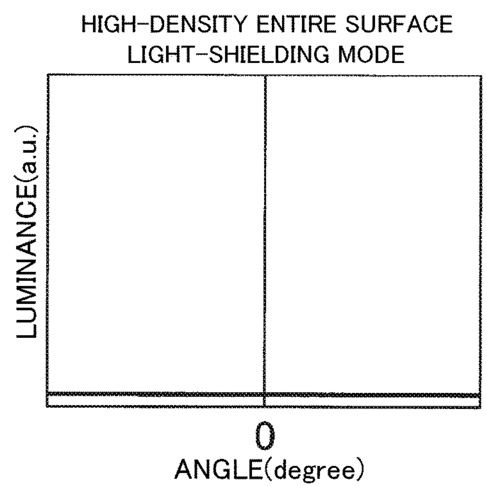

Regarding the luminance distribution in the high-density entire surface light-shielding mode, the luminance is low at all the angles as shown in FIG. 9B. Therefore, the external appearance thereof appears extremely dark in all the directions.

Figure 3:
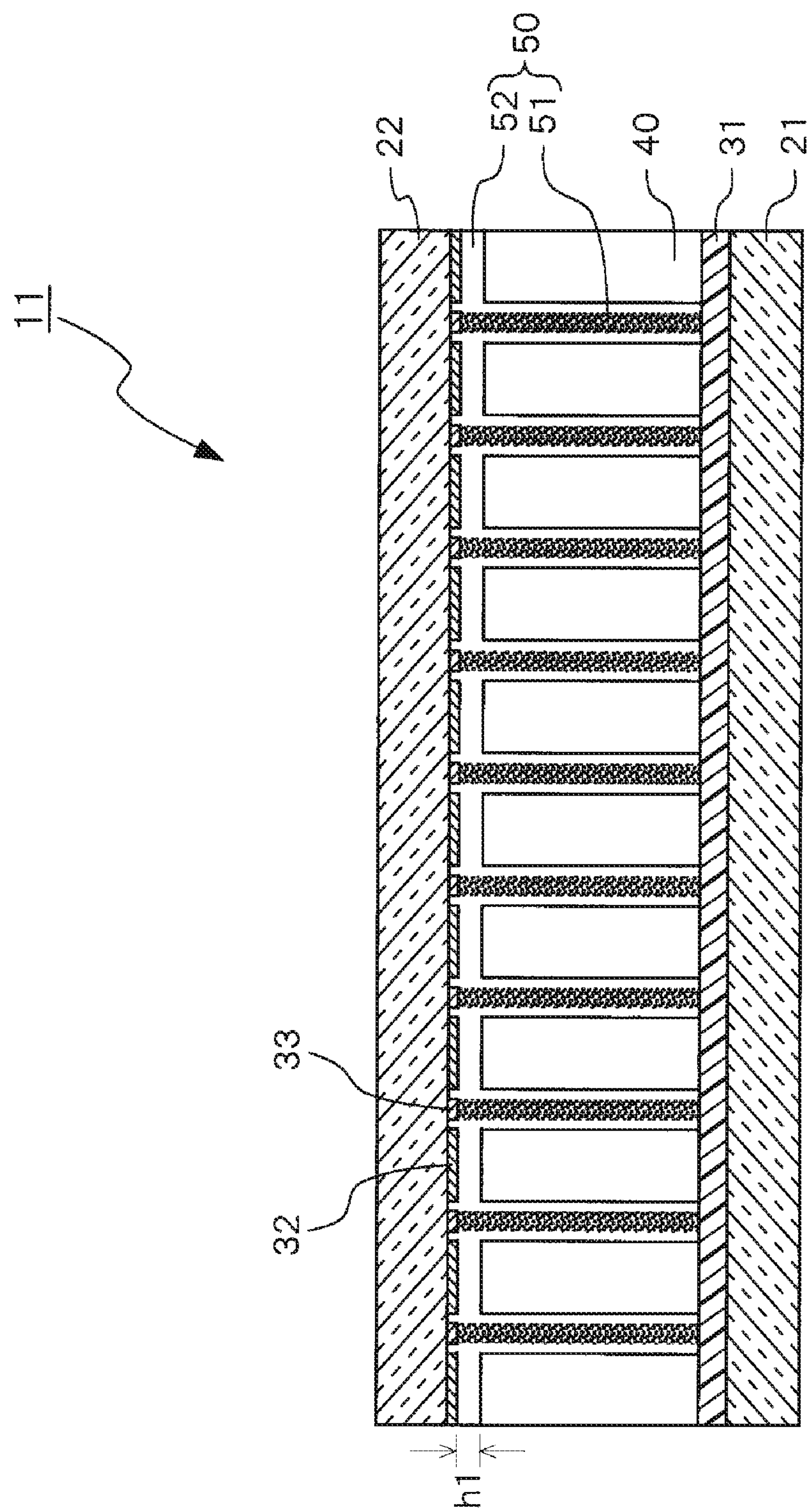
FIG. 3 is a sectional view showing a narrow viewing field mode of the light-modulating element according to the first embodiment of the present invention.

The narrow viewing field mode shown in FIG. 3 is achieved by disposing the electrophoretic particles 51 between the third transparent electrodes 33 and the first transparent electrode 31 as also shown in FIG. 7.

At this time, through setting the third transparent electrodes 33 and the first transparent electrode 31 to be of the same potential and setting the relative potentials of the second transparent electrodes 32 with respect to the third transparent electrodes 33 and the first transparent electrode 31 to be of the same polarity with that of the surface charge of the electrophoretic particles 51, the electrophoretic particles 51 are eliminated from the regions sandwiched between the second transparent electrodes 32 and each of the light transmissive regions 40.

That is, for achieving the narrow viewing field mode according to the external signals, it is so structured that the electric field application control module 35 sets the first transparent electrode 31 and the third transparent electrodes 33 to be of the same potential and sets the relative potential of the second transparent electrodes 32 with respect to the third transparent electrodes 33 to be of the same polarity with that of the surface charge of the electrophoretic particles 51 to dispose the electrophoretic particles 51 in the regions excluding the air gap 55A between the second transparent electrodes 32 and the light transmissive regions 40.

Figure 7A:
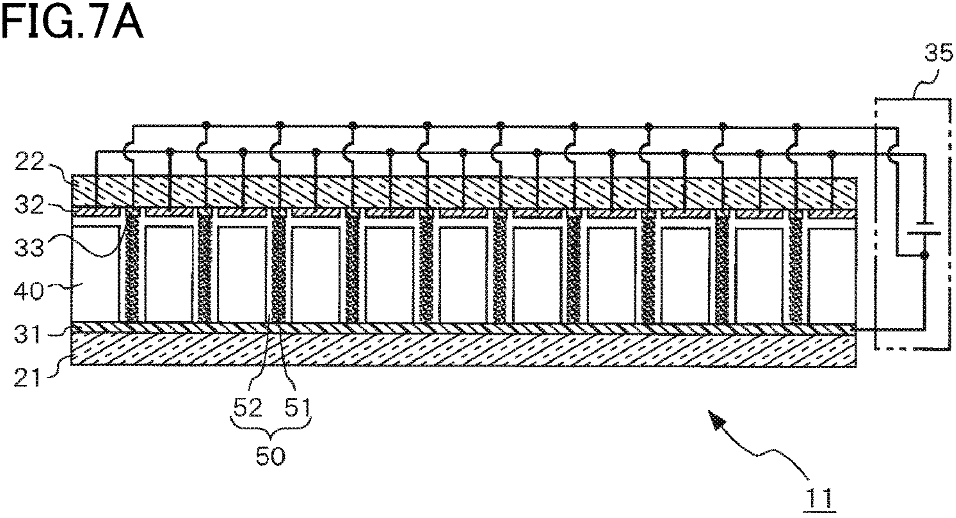
Figure 7B:
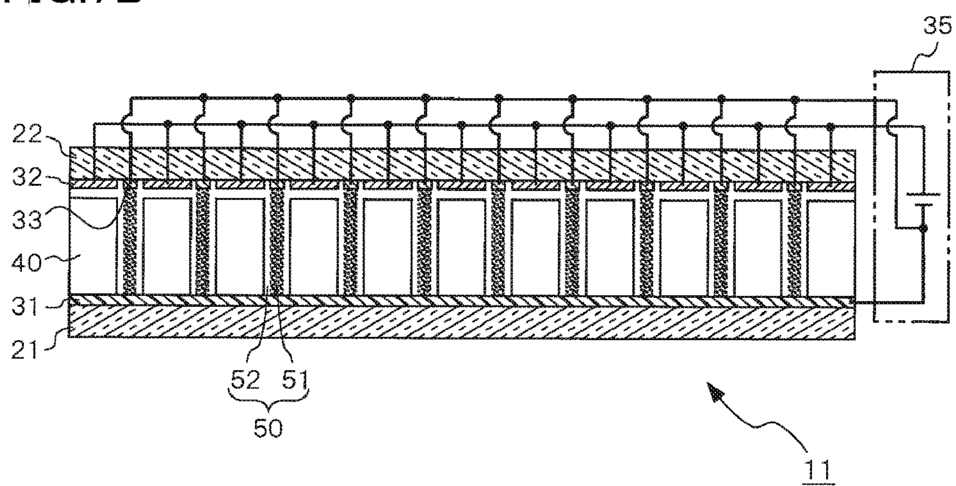

Therefore, in a case where the surface charge of the electrophoretic particles 51 is a negative charge (−), the electric field application control module 35 sets the first transparent electrode 31 and the third transparent electrode 33 to be of a positive polarity as shown in FIG. 7A. In a case where the surface charge of the electrophoretic particles 51 is a positive charge (+), the electric field application control module 35 sets the first transparent electrode 31 and the third transparent electrodes 33 to be of a negative polarity as shown in FIG. 7B.

Figure 9C:
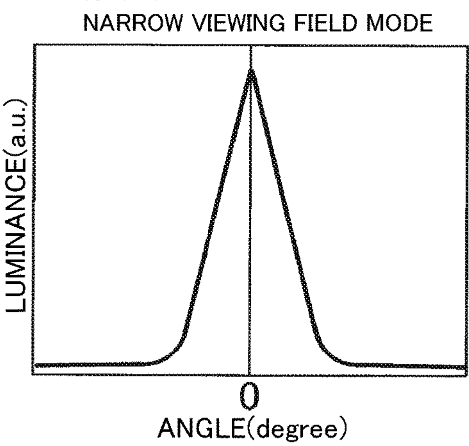

Regarding the luminance distribution in the narrow viewing field mode, the luminance near the front is high and the luminance becomes lower as the angle becomes larger as shown in FIG. 9C. Therefore, the external appearance in the front direction appears bright while it appears extremely dark in the oblique directions.

Figure 4:
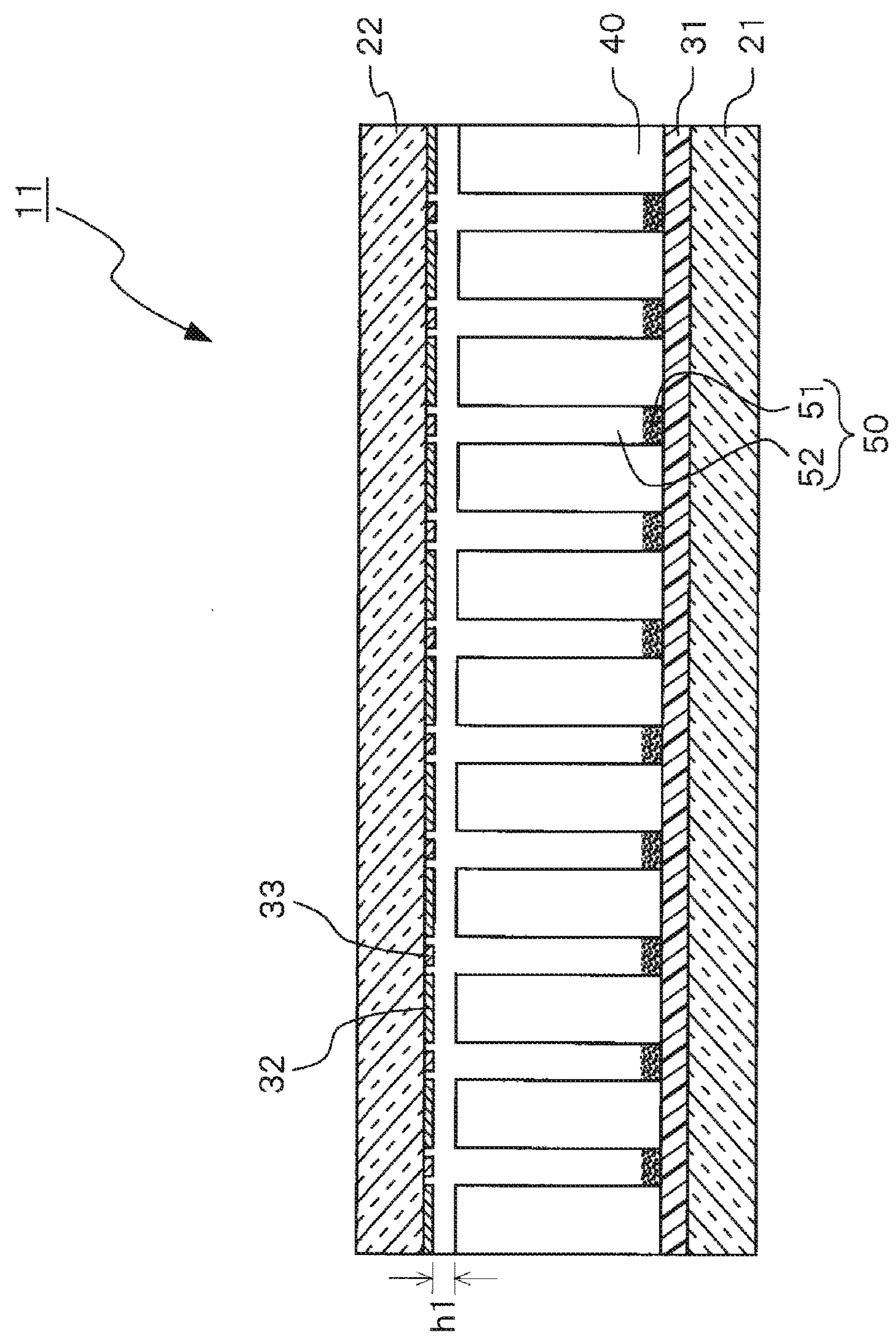
FIG. 4 is a sectional view showing a wide viewing field mode of the light-modulating element according to the first embodiment of the present invention.

The wide viewing field mode shown in FIG. 4 is achieved by gathering the electrophoretic particles 51 in the vicinity of the first transparent electrode 31 between the patterns of each of the neighboring light transmissive regions 40 as also shown in FIG. 8.

At this time, through setting the second transparent electrodes 32 and the third transparent electrodes 33 to be of the same potential and the relative potentials of the second transparent electrodes 32 and the third transparent electrodes 33 with respect to the first transparent electrode 31 to be of the same polarity with that of the surface charge of the electrophoretic particles 51, the electrophoretic particles 51 are aggregated in the vicinity of the first transparent electrode 31.

That is, for achieving the wide viewing field mode according to the external signals, it is so structured that the electric field application control module 35 sets the relative potential of the third transparent electrode 33 with respect to the first transparent electrode 31 to be of the same polarity as the surface charge of the electrophoretic particles 51 and sets the second transparent electrode 32 and the third transparent electrode 33 to be of the same potential to dispose the electrophoretic particles 51 in the vicinity of the first transparent electrode 31.

Figure 8A:
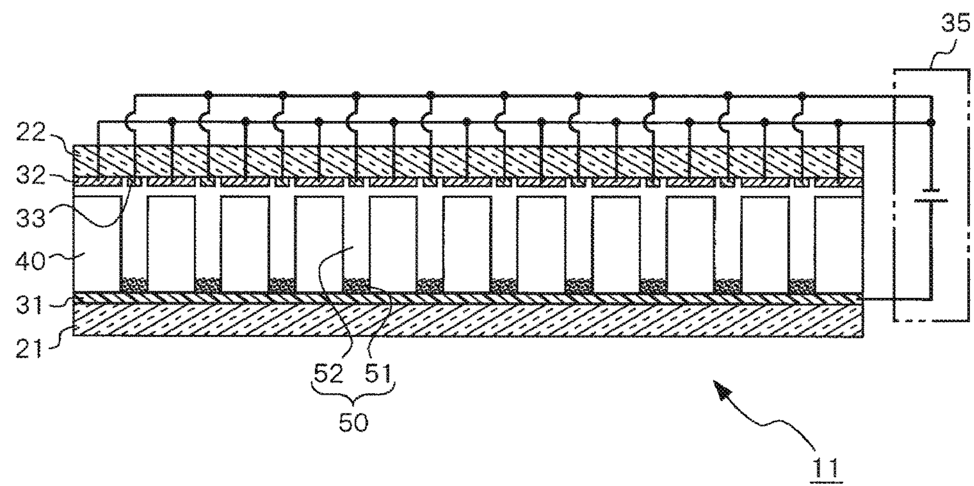
Figure 8B:
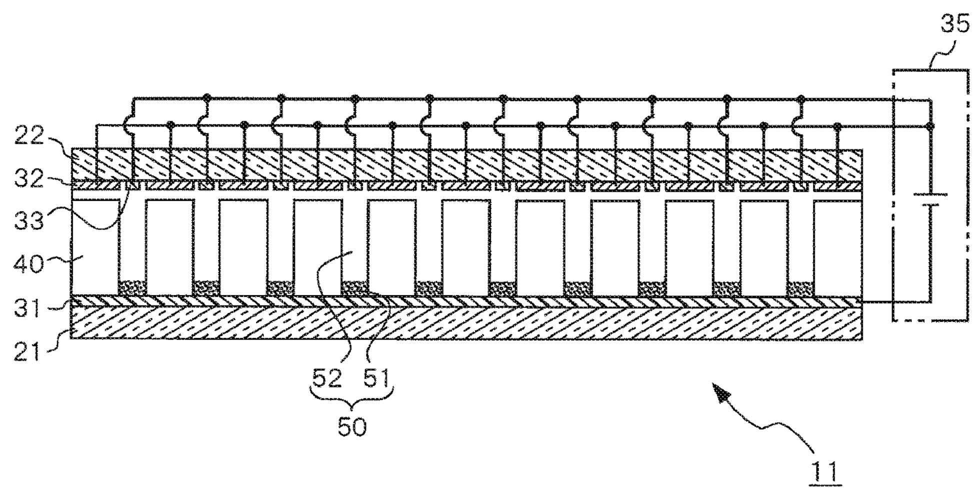

Therefore, in a case where the surface charge of the electrophoretic particles 51 is a negative charge (−), the electric field application control module 35 sets the first transparent electrode 31 to be of a positive polarity as shown in FIG. 8A. In a case where the surface charge of the electrophoretic particles 51 is a positive charge (+), the electric field application control module 35 sets the first transparent electrode 31 to be of a negative polarity as shown in FIG. 8B.

Figure 9D:
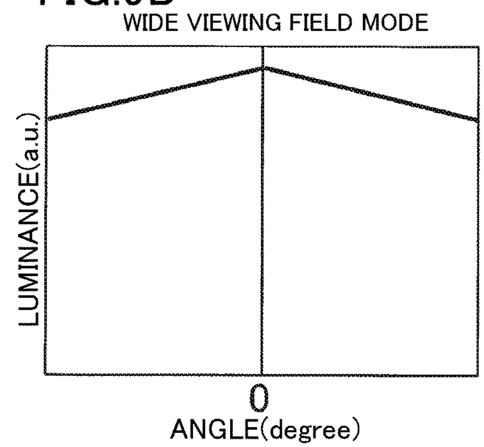

Regarding the luminance distribution in the wide viewing field mode, the luminance near the front is the highest as shown in FIG. 9D. However, there is no remarkable angle dependency at other angles, and luminance deterioration amount is small. Therefore, the external appearance in all the directions appears bright.

The above-described structural content can be summarized as follows. The light-modulating element 11 according to the first embodiment employs the structure including: the first transparent substrate 21; the second transparent substrate 22 disposed in opposition to the first transparent substrate 21; the first transparent electrode 31 disposed on the surface of the first transparent substrate 21 in opposition to the second transparent substrate 22; a plurality of the light transmissive regions 40 formed to be isolated from each other on the first transparent electrode 31; a plurality of the second transparent electrodes 32 disposed at positions facing with each of the light transmissive regions 40 on the second transparent substrate 22 with a prescribed distance provided with each of the light transmissive regions 40; a plurality of the third transparent electrodes 33 individually disposed between each of the second transparent electrodes 32 on the second transparent substrate 22 side; the electrophoretic member 50 disposed in the air gap 55 formed between the first transparent substrate 21 on which the first transparent electrode 31 and each of the light transmissive regions 40 are disposed and the second transparent substrate 22 on which each of the second transparent electrodes 32 and each of the third transparent electrodes 33 are disposed; and the spacer 56 that is a member for securing the prescribed distance (isolated distance h1) between each of the light transmissive regions 40 and the second transparent electrode 32.

(Specific Structures)

Next, the structural content of the light-modulating element 11 will be described in more details by referring to FIG. 1 and the like.

As described above, the light-modulating element 11 includes the first transparent substrate 21. In the first embodiment, a glass substrate type, a PET (Poly Ethylene Terephthalate) type, a PC (Poly Carbonate) type, or a PEN (Poly Ethylene Naphthalate) type is employed as the first transparent substrate 21.

Further, the first transparent electrode 31 is formed on the upper part of the first transparent substrate 21. The first transparent electrode 31 can be formed with a transparent conductive material such as ITO, ZnO, IGZO, a conductive nanowire, or the like. In the first embodiment, ITO is employed.

The plurality of light transmissive regions 40 are formed on the first transparent substrate 21. Further, on the upper side of each of those light transmissive regions 40, the second transparent substrate 22 on which the second transparent electrodes 32 are formed is disposed with the air gap 55A provided therebetween.

That is, on the surface of the second transparent substrate 22 on each light transmissive region 40 side, the second transparent electrodes 32 and the third transparent electrodes 33 are formed.

As the structural materials of the second transparent electrodes 32 and the third transparent electrodes 33, it is possible to employ a transparent conductive material such as ITO, ZnO, IGZO, a conductive nanowire, or the like as in the case of the first transparent electrode 31. In the first embodiment, each of the transparent electrodes is formed with ITO.

Further, the film thickness of the first transparent electrode 31, the second transparent electrode 32, and the third transparent electrode 33 is preferable to fall within a range of 10 nm to 1000 nm. In the first embodiment, those electrodes are all formed to have the film thickness of 100 nm.

Note here that the second transparent electrodes 32 are formed at positions facing with each of the light transmissive regions 40, and the third transparent electrodes 33 are formed between the second transparent electrodes 32. Further, the electrophoretic member 50 that is a mixture of the electrophoretic particles 51 exhibiting the light-shielding characteristic and the dispersant 52 exhibiting the transmissive characteristic is disposed in the space between the first transparent substrate 21 and the second transparent substrate 22.

The height of each of the light transmissive regions 40 is preferable to fall within a range of 3 μm to 1000 μm. In the first embodiment, it is set as 60 μm.

Further, the width of each of the light transmissive regions 40 is preferable to fall within a range of 1 μm to 500 μm. In the first embodiment, it is set as 20 μm.

Furthermore, the width between each of the light transmissive regions 40 is preferable to fall within a range of 0.25 μm to 40 μm. In the first embodiment, it is set as 5 μm.

Next, the dispersion states of the electrophoretic particles 51 in each operation mode will be described by referring to the perspective views of FIG. 10 to FIG. 13 showing the outline of the light-modulating element 11. At the same time, the light shielding conditions resulted from the dispersion states of the electrophoretic particles 51 will be described by referring to the surface views shown in FIG. 14 to FIG. 17 corresponding to each of those drawings.

Figure 10:
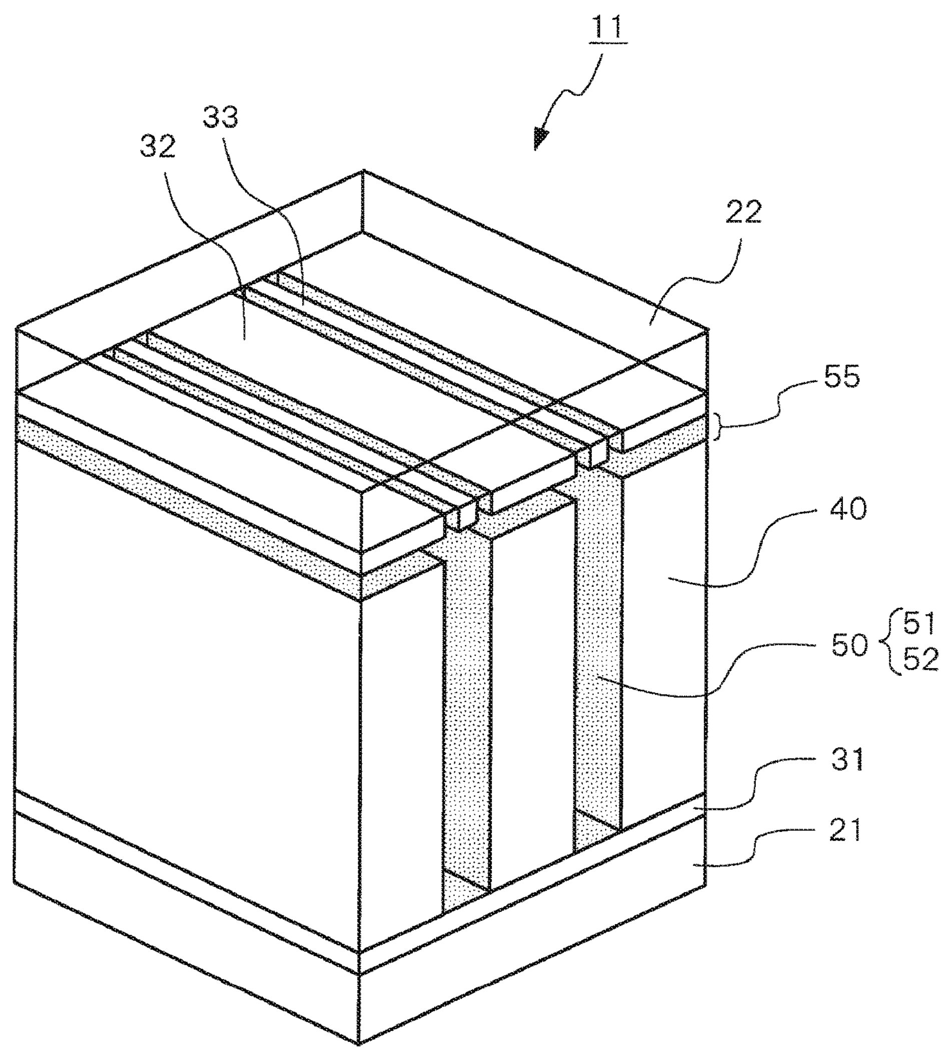
FIG. 10 is a perspective view showing the low-density entire surface light-shielding mode of the light-modulating element disclosed in FIG. 1.

The electrophoretic particles 51 within the electrophoretic member 50 located in the air gap 55 formed between the first transparent substrate 21 on which the first transparent electrode 31 and each of the light transmissive regions 40 are disposed and the second transparent substrate 22 on which each of the second transparent electrodes 32 and each of the third transparent electrodes 33 are disposed are dispersed equivalently within the air gap 55 in a case of the low-density entire surface light-shielding mode shown in FIG. 10.

Note here that the electrophoretic member 50 exists only between each of the second transparent electrodes 32 and each of the third transparent electrodes 33 at the positions of each of the light transmissive regions 40. In the meantime, a lot of the electrophoretic members 50 exist between each of the light transmissive regions 40 since relatively wide space is secured therebetween.

That is, looking at the stacking direction, a great number of electrophoretic particles 51 exist in the regions in the vicinity of a width 40*b* of the third transparent electrodes, while a small number of electrophoretic particles 51 exist in the region of a width 40*a* of the second transparent electrodes.

Figure 14:
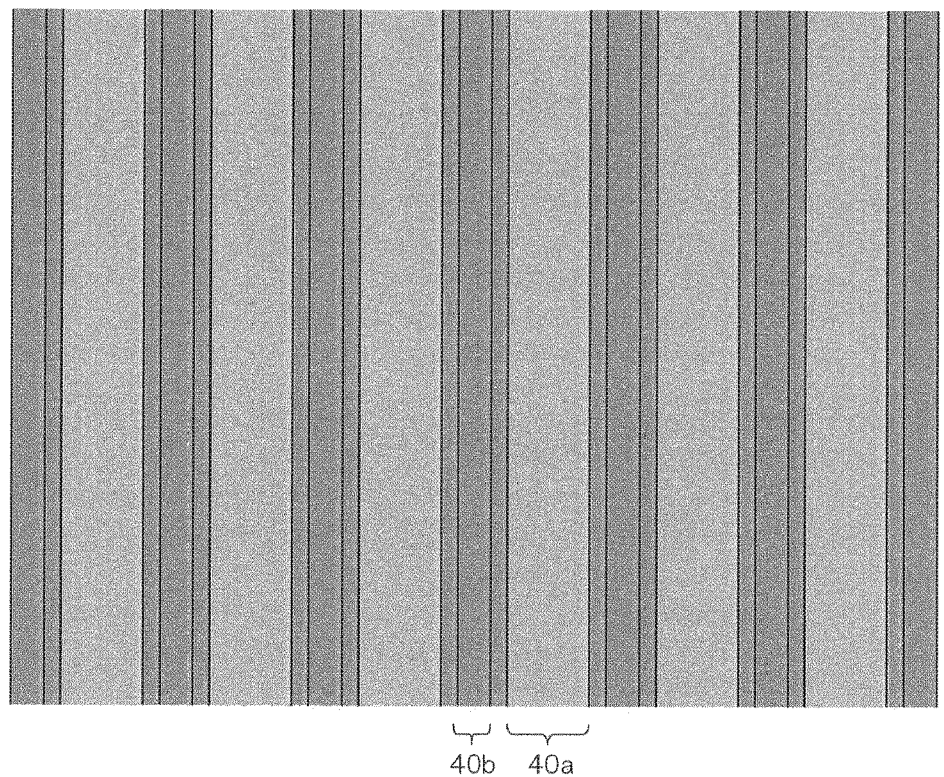
FIG. 14 is a surface view showing the low-density entire surface light-shielding mode of the light-modulating element disclosed in FIG. 1.

Therefore, as in FIG. 14 showing the surface view of such case, the transmittance at the positions of each of the second transparent electrodes 32 and each of the light transmissive regions 40 becomes higher compared to that at the positions between each of the light transmissive regions 40. Therefore, the oblique directions are extremely dark, while the front direction comes to be in a slightly dark state.

Figure 11:
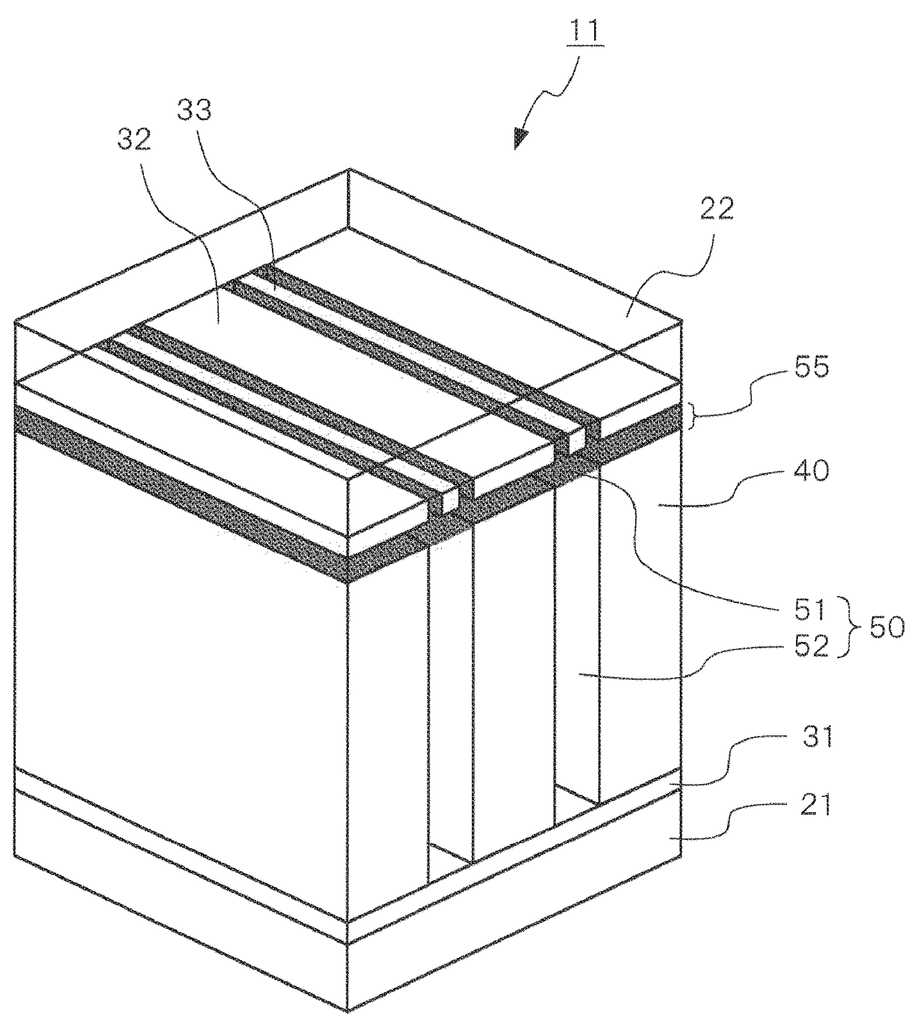
FIG. 11 is a perspective view showing the high-density entire surface light-shielding mode of the light-modulating element disclosed in FIG. 2.
Figure 15:
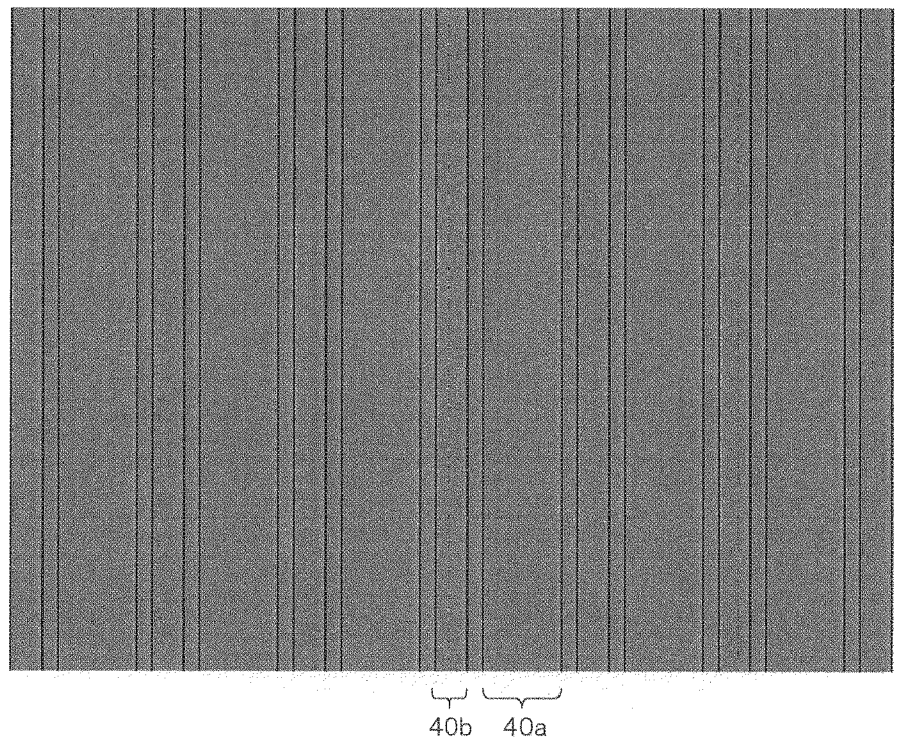
FIG. 15 is a surface view showing the high-density entire surface light-shielding mode of the light-modulating element disclosed in FIG. 2.

In the case of the high-density entire surface light-shielding mode shown in FIG. 11, the electrophoretic particles 51 aggregate in the vicinity of each of the second transparent electrode 32 and each of the third transparent electrodes 33 and there is almost no difference in the dispersion amount of the electrophoretic particles 51 in the stacking direction. Thus, as shown in FIG. 15, the high-density light-shielding characteristic is secured for all the directions of the outside.

Figure 12:
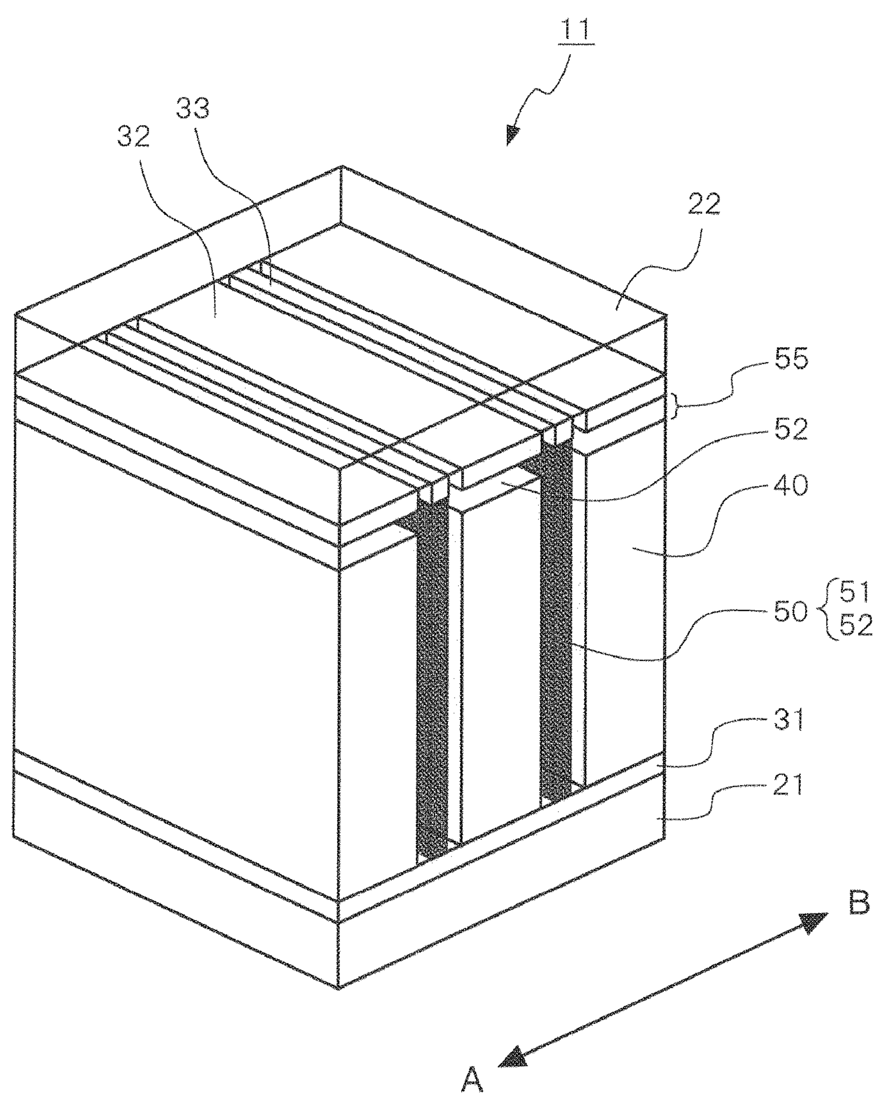
FIG. 12 is a perspective view showing the narrow viewing field mode of the light-modulating element disclosed in FIG. 3.
Figure 16:
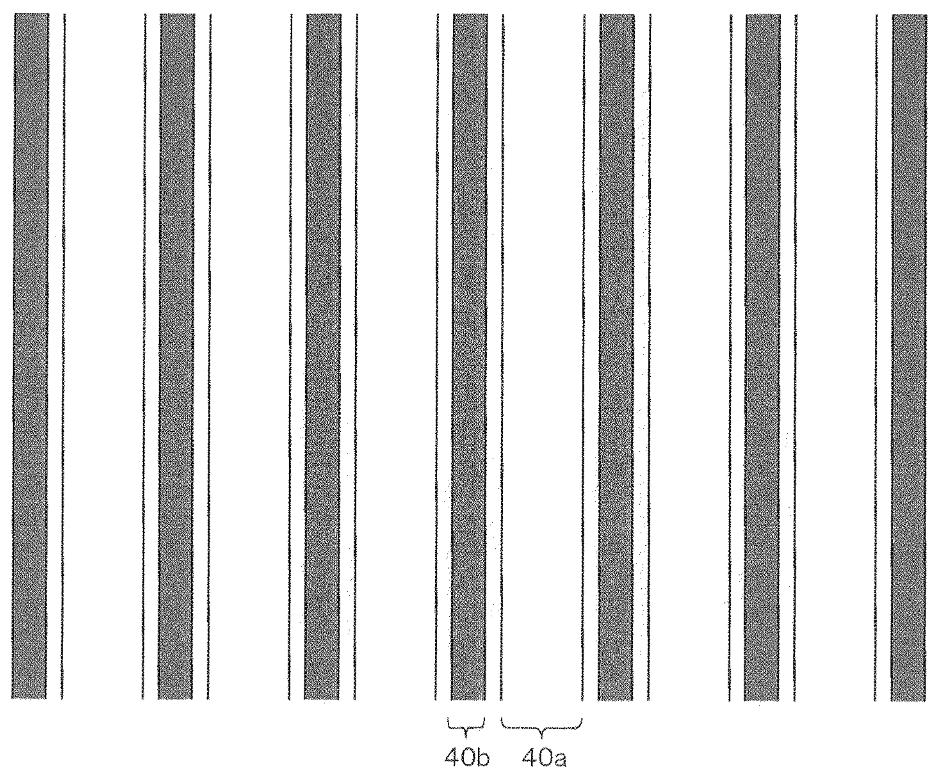
FIG. 16 is a surface view showing the narrow viewing field mode of the light-modulating element disclosed in FIG. 3.

In the case of the narrow viewing field mode shown in FIG. 12, the electrophoretic particles 51 gather in a connecting manner in the stacking direction at positions of each of the third transparent electrodes 33 between each of the light transmissive regions 40. Thus, as shown in FIG. 16, the light-shielding characteristic becomes extremely high only at the positions of each of the third transparent electrodes 33 while the transmittance at the positions of each of the second transparent electrodes 32 becomes extremely high. This provides a state where the light transmissive characteristic is exhibited only in the front direction thereof, and the light-shielding characteristic is exhibited in the oblique directions.

That is, paying attention to the stacking direction, the electrophoretic particles 51 exist only in the regions of the width 40*b* of the third transparent electrodes 33. Therefore, a blind-like light-shielding state is formed with the repeated disposition of the width 40*a* of the second transparent electrodes and the width 40*b* of the third transparent electrodes continuously provided in an alternate manner.

In this case, the visible angles in A-B direction of FIG. 12 is limited to about ±30°.

Figure 13:
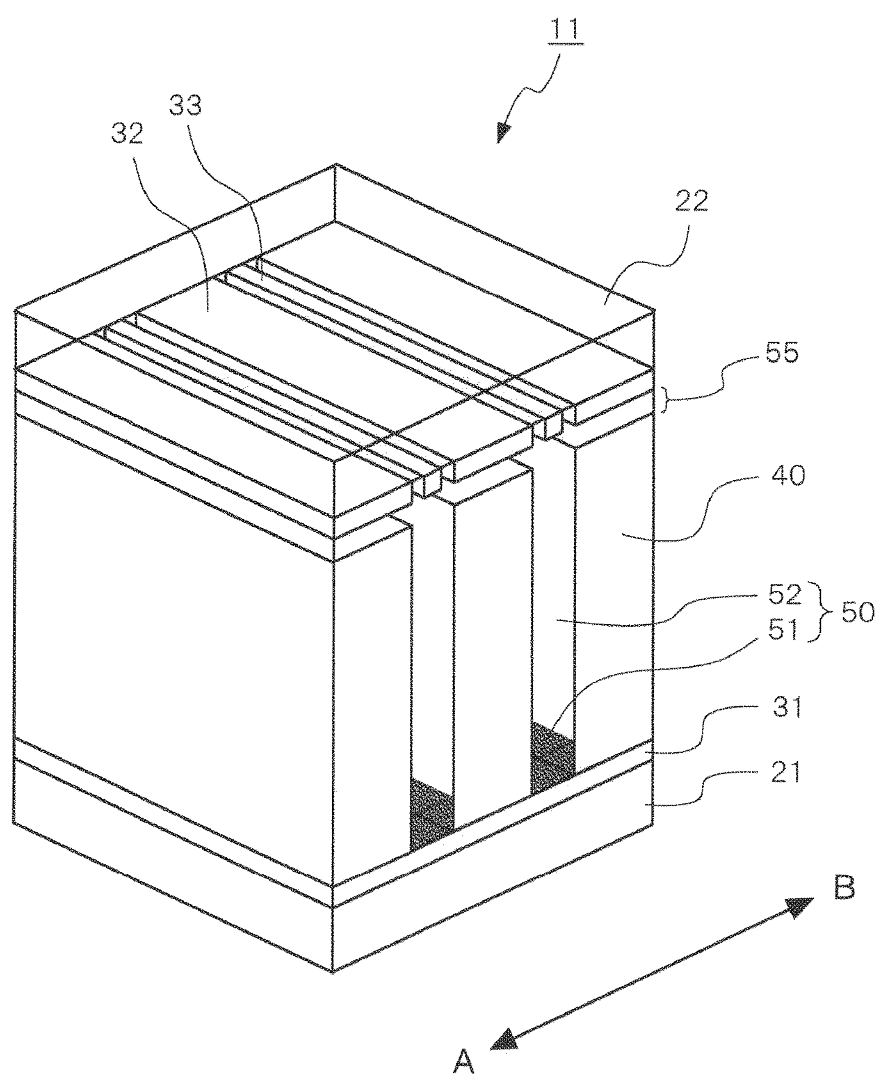
FIG. 13 is a perspective view showing the wide viewing field mode of the light-modulating element disclosed in FIG. 4.
Figure 17:
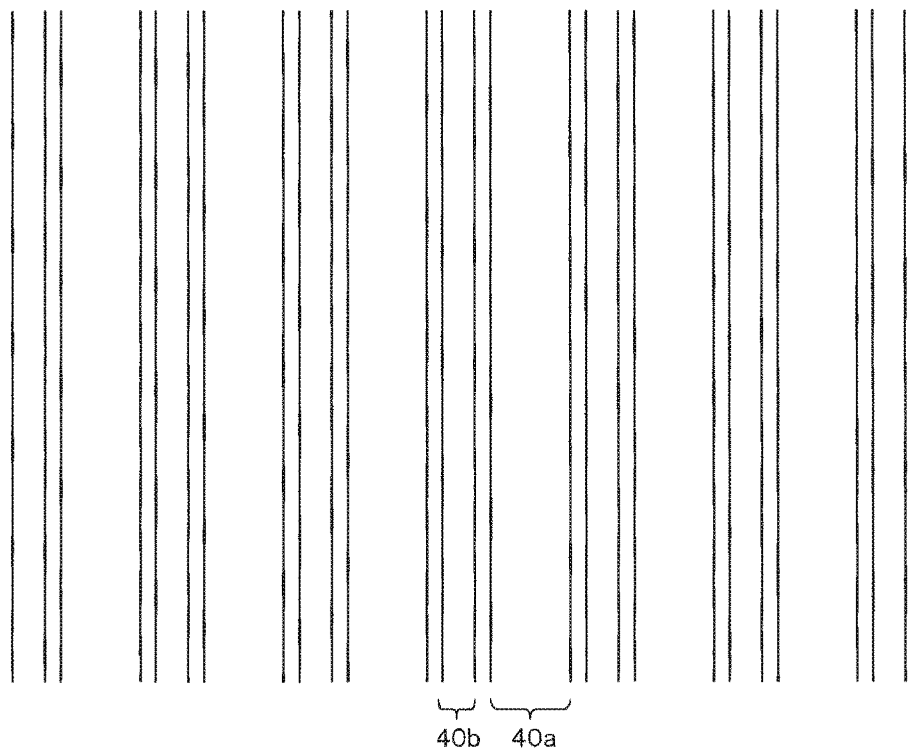
FIG. 17 is a surface view showing the wide viewing field mode of the light-modulating element disclosed in FIG. 4.

In the case of the wide viewing field mode shown in FIG. 13, the electrophoretic particles 51 aggregate in the vicinity of the first transparent electrode 31 between each of the light transmissive regions 40. Thus, as shown in FIG. 17, the light transmissive characteristic is secured for all the directions of the outside, and the external appearance thereof appears bright as a whole.

In this case, there is no specific limit set in the visible angles in A-B direction of FIG. 13.

(Manufacturing Method of Light-Modulating Element)

Herein, a manufacturing method of the light-modulating element according to the first embodiment will be described by referring to FIG. 18 which illustrates each of steps thereof.

First, as shown in FIGS. 18A-18F, the first transparent electrode 31 is formed on the surface (main face) of the first transparent substrate 21 (a first transparent electrode forming step). On the main face side of the first transparent substrate 21 where the first transparent electrode 31 is formed, a transparent photosensitive resin layer 45 is formed as a negative-type photoresist film as shown in FIG. 18B (a photosensitive resin stacking step).

Note that the transparent photosensitive resin layer 45 is a member to become the light transmissive regions 40 through execution of a transmissive region forming step to be described later.

Next, as shown in FIG. 18C, the transparent photosensitive resin layer 45 is exposed by irradiating exposure light 95 to the transparent photosensitive resin layer 45 through a photomask 90 that has a mask pattern 91 (an exposure light irradiating step).

Then, through applying development processing on the exposed transparent photosensitive resin layer 45, a plurality of light transmissive regions 40 that are isolated from each other as shown in FIG. 18D are formed (a transmissive region forming step).

Subsequently, as shown in FIG. 18E, the second transparent substrate 22 including the second transparent electrodes 32 and the third transparent electrodes 33 is disposed on the upper side of the light transmissive regions 40 with the air gap 55A (isolated distance h1) being secured therebetween (a second transparent substrate disposing step).

When executing the second transparent substrate disposing step, the positions of the first transparent substrate 21 and the second transparent substrate 22 are adjusted and controlled so that each of the second transparent electrodes 32 come to be in opposition to each of the light transmissive regions 40.

Then, as shown in FIG. 18F, the electrophoretic members 50 are filled in the air gap (space) 55 sandwiched between the first transparent substrate 21 and the second transparent substrate 22 (a migration element filling step).

The film thickness of the first transparent electrode 31, the second transparent electrode 32, and the third transparent electrode 33 is preferable to fall within a range of 10 nm to 1000 nm. In the first embodiment, those electrodes are all formed to have the film thickness of 100 nm.

As described above, the light-modulating element manufacturing method according to the first embodiment is structured including each of the above-described steps (the first transparent electrode forming step, the photosensitive resin stacking step, the exposure light irradiating step, the transmissive region forming step, the second transparent disposing step, and the migration element filling step).

Next, the manufacturing method of the light-modulating element 11 will be described in more details by referring to FIG. 19 which illustrates the spacer used for securing the isolated distance h1 in addition to FIGS. 18A-18F.

First, the first transparent electrode 31 is formed by selecting ITO from ITO, ZnO, IGZO, a conductive nanowire, and the like on the main surface of the first transparent substrate 21 formed with glass, PET, PC, or PEN (FIG. 18A: the first transparent electrode forming step), and the transparent photosensitive resin layer 45 is formed thereon (FIG. 18B: the photosensitive resin stacking step).

As a method for forming the transparent photosensitive resin layer 45, it is possible to use any deposition methods selected from slit die coater, wire coater, applicator, dry film transcription, spraying, screen printing, and the like, for example.

The proper thickness of the transparent photosensitive resin layer 45 is within a range of 30 μm to 300 μm. In the first embodiment, it is formed to have the thickness of 60 μm by using the above-described deposition methods.

Further, as the transparent photosensitive resin used for the transparent photosensitive resin layer 45, chemical amplification type photoresist (product name "SU-8) of Microchem is employed in the first embodiment. The features of the transparent photosensitive resin are as follows.

The first feature is that it is an epoxy-based (specifically, bisphenol A novolac diglycidyl ether derivative) negative resist with which a photoinitiator generates acid by irradiating ultraviolet rays and a curable monomer is polymerized by having the proton acid as a catalyst.

The second feature is that it exhibits an extremely high transparency in the visible light regions.

The third feature is that the molecule amount of the curable monomer contained in the transparent photosensitive resin before being cured is relatively small, so that it can be dissolved extremely well in cyclopetanone, propylene glycol methyl ether acetate (PEGMEA), gamma butyl lactone (GBL), isobutyl ketone (MIBK), and the like. Therefore, thick film thickness can be formed easily.

The fourth feature is that ultraviolet rays can be transmitted therethrough even with thick films, since the light transmissive characteristic is extremely fine even in the wavelengths of the near ultraviolet regions.

The fifth feature is that it is possible to form high aspect-ratio patterns of 3 or higher because of each of the above-described features.

The sixth feature is that it turns out as an extremely high-density cross linkage after being cured since there are many functional groups in the curable monomer, so that it is extremely stable both thermally and chemically. Therefore, processing after forming the pattern can be done easily.

It is also possible to use other photocurable materials exhibiting the same characteristics as those of the chemical amplification type photoresist (product name "SU-8) that is the transparent photosensitive resin as the structural material of the transparent photosensitive resin layer 45.

Then, in the above-described exposure light irradiating step, the transparent photosensitive resin layer 45 is patterned by using the mask pattern 91 of the photomask 90 (FIG. 18C: the exposure light irradiating step).

Exposure light 95 used for the exposure in the exposure light irradiating step is parallel light. In the first embodiment, as shown in FIG. 18C, the exposure light is emitted to the direction that is in parallel to the stacking direction.

As a light source of the exposure light 95, a UV light source is used. In the first embodiment, UV light with the wavelength of 365 nm is irradiated as the exposure light 95. Further, the exposure amount at the time of irradiation is preferable to be within a range of 50 mJ/cm$^2$ to 500 mJ/cm$^2$. In the first embodiment, it is set as 200 mJ/cm$^2$.

Development is done on the transparent photosensitive resin layer 45 after the exposure, and then heat annealing (heat annealing processing) is performed at 120° C. for thirty minutes. Thereby, a plurality of sectioned light transmissive regions 40 are formed on the transparent photosensitive resin layer 45. The space width between each of the light transmissive regions 40 is formed to be 5 μm (FIG. 18D: the transmissive region forming step).

The refractive index of the light transmissive regions 40 formed with the chemical amplification type photoresist (product name "SU-8) becomes 1.5 to 1.6.

Subsequently, the second transparent substrate 22 including the second transparent electrodes 32 and the plurality of third transparent electrodes 33 is disposed on the light transmissive regions 40 (FIG. 18E: the second transparent substrate disposing step).

The second transparent electrodes 32 and the third transparent electrodes 33 are both formed with a plurality of electrodes, and those are disposed alternately with a prescribed space provided therebetween as shown in FIG. 18E and the like.

Figure 19:
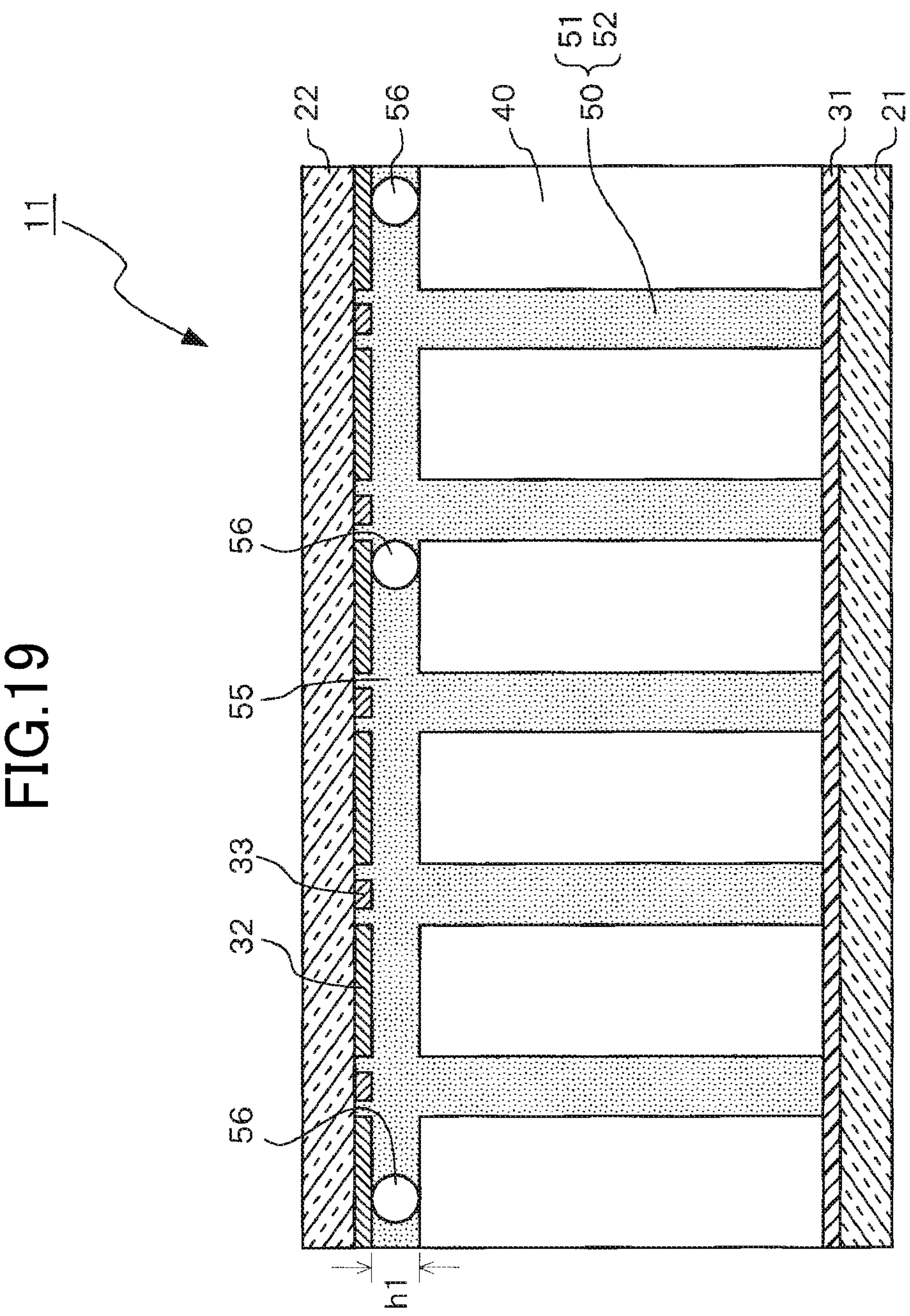
FIG. 19 is a sectional view showing the state where a spacer is disposed in a manufacturing step of the light-modulating element disclosed in FIG. 19.

In the second transparent substrate disposing step, the spacer 56 is disposed between the light transmissive regions 40 and the second transparent electrodes 32 as shown in FIG. 19 in order to secure the air gap 55 for effectively functioning the electrophoretic members 50 filled in the migration element filling step to be described later.

The isolated distance h1 can be secured by the spacer 56, which makes it possible to form the air gap 55 to which the electrophoretic members 50 are filled. The spacer 56 is formed with a light-shielding spacer exhibiting a light-shielding characteristic in a part or a whole part thereof.

Then, the second transparent substrate 22 is fixed with the outer peripheral part of the first transparent substrate 21 by using an adhesive (not shown). As the adhesive, a heat curable type or a UV curable type may be used.

At last, the electrophoretic member 50 as a mixture of the electrophoretic particles 51 and the dispersant 52 is filled in the air gap 55 that is formed between the first transparent electrode 31 and the light transmissive regions 40 on the first transparent substrate 21 and the second transparent electrodes 32 and the third transparent electrodes 33 formed on the second transparent substrate 22. The surface charge is given in advance to the electrophoretic particles 51 (FIG. 18F: the migration element filling step).

Effects and the Like of First Embodiment

In a case where an existing light-ray direction control element is loaded as a glass built-in blind, it is not possible to achieve a state where the entire surface of the substrate is light-shielded while a state of wide visible range and a state of narrow visible range can be achieved. Further, with the light-modulating function of an existing electrochromic element, the light-modulating states to be achieved are limited only to two kinds such as a transparent state and a light-shielding state.

However, the light-modulating element 11 according to the first embodiment employs the structure with which each of the second transparent electrodes 32 and each of the third transparent electrodes 33 are provided at the positions in oppositions to the first transparent electrode 31 on the first transparent substrate 21 via the plurality of light transmissive regions 40 isolated from each other and the electrophoretic member 50. Therefore, it is possible to arbitrarily achieve the four light-modulating states such as a state where the entire surface is light-shielded in low density (the low-density entire surface light-shielding mode), a state where the entire surface is light-shielded in high density (the high-density entire surface light-shielding mode), a state where the front direction is in a light transmissive state and only the oblique directions are light-shielded (the narrow viewing field mode), and a state where a fine light transmissive characteristic is exhibited both in the front direction and the oblique directions (the wide viewing field mode).

That is, it is possible to control the degree of shielding the light arbitrarily and to control the range of the exit directions of the transmitted light at the same time, so that the transmission state of the transmitted light can be effectively adjusted and controlled according to the demands and the changes in the use environment.

Second Embodiment

A second embodiment of the light-modulating element according to the present invention will be described by referring to FIG. 20. Same reference numerals are to be used for the structural members equivalent to those of the first embodiment described above, and explanations thereof are omitted.

Figure 20:
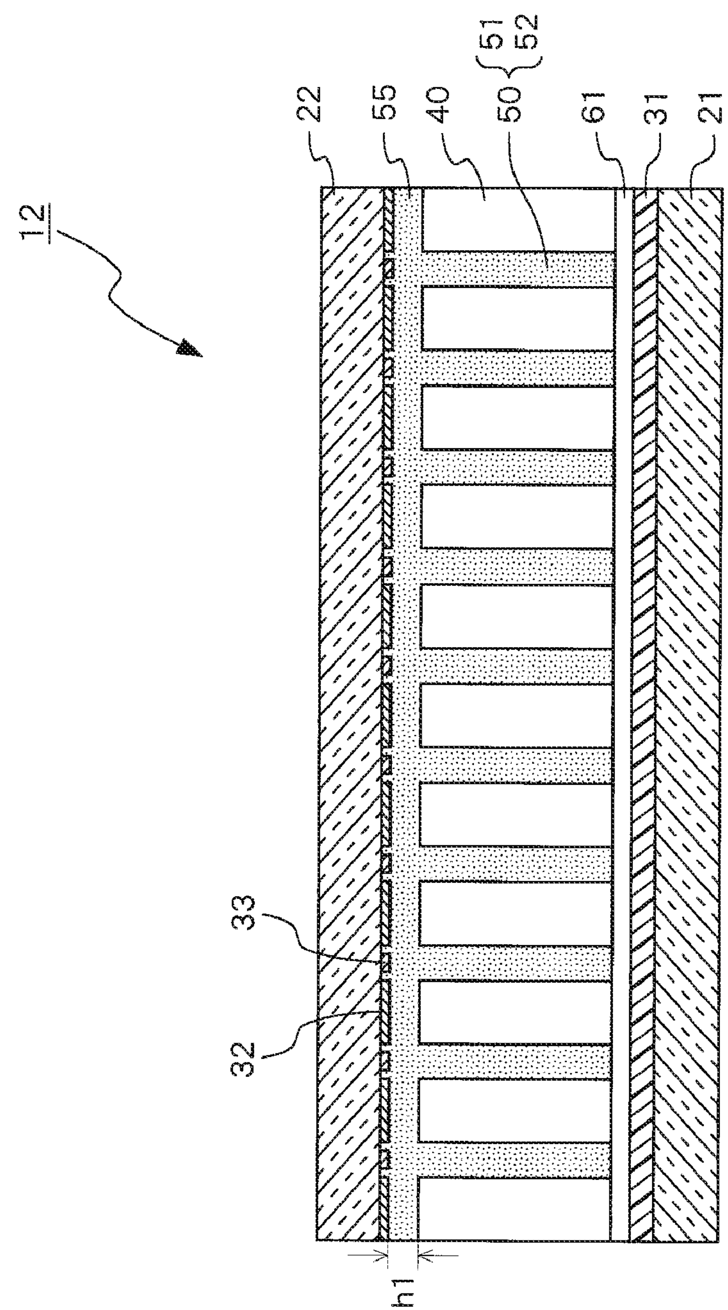
FIG. 20 is a sectional view showing a light-modulating element according to a second embodiment of the present invention.

As shown in FIG. 20, a light-modulating element 12 according to the second embodiment has a feature in respect that there is a first interlayer insulating film (an on-first-electrode insulating film) 61 disposed between the first transparent electrode 31 and the light transmissive regions 40. In this respect, it is different from the first embodiment described above.

The film thickness of the first interlayer insulating film 61 is preferable to fall within a range of 10 nm to 1000 nm. In the second embodiment, it is formed to have the film thickness of 100 nm.

As the structural material of the first interlayer insulating film 61, it is possible to use a silicon oxide film, a silicon nitride film, a silicon oxynitride film, or the like. In the second embodiment, the silicon oxide film is employed.

Effects and the Like of Second Embodiment

As described above, in the light-modulating element 12 of the second embodiment, the first interlayer insulating film 61 as an insulating film is formed between the first transparent electrode 31 and the light transmissive regions 40. This makes it possible to avoid contact between the electrophoretic member 50 and the first transparent electrode 31.

Therefore, such structure can prevent attachment and the like of the electrophoretic particles 51 to the first transparent electrode 31, so that it is possible to provide the light-modulating element whose transmittance in the narrow viewing field mode and the wide viewing field mode is stable. Other structures and steps regarding the manufacturing method thereof are same as the content described in the first embodiment, and other operations and effects to be generated are also the same.

Third Embodiment

A third embodiment of the light-modulating element according to the present invention will be described by referring to FIG. 31. Same reference numerals are to be used for the structural members equivalent to those of the second embodiment described above, and explanations thereof are omitted.

Figure 31:
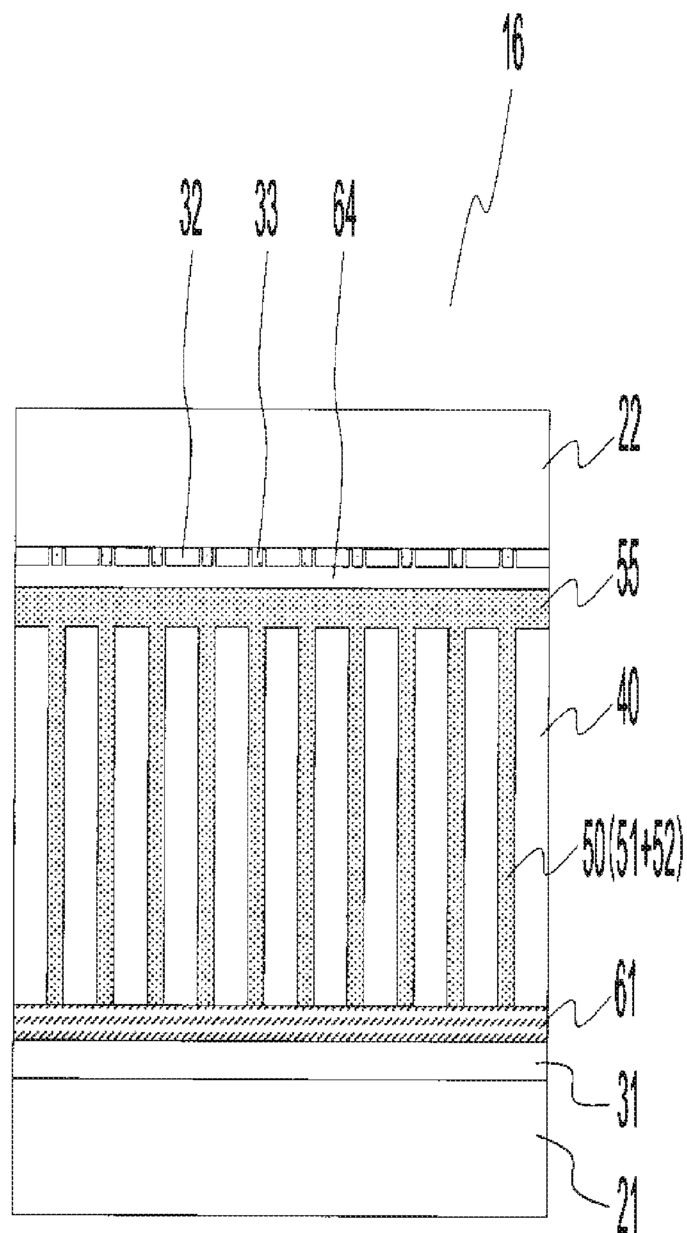
FIG. 31 is a sectional view showing a light-modulating element according to a third embodiment of the present invention.

As shown in FIG. 31, a light-modulating element 16 according to the third embodiment has a feature in respect that there is a fourth interlayer insulating film (an on-second-and-third-electrodes insulating film) 64 disposed on the surfaces of the second transparent electrodes 32 and the third transparent electrodes 33 in addition to the first interlayer insulating film (the on-first-electrode insulating film) 61 disposed between the first transparent electrode 31 and the light transmissive regions 40. In this respect, it is different from the second embodiment described above.

The film thickness of the fourth interlayer insulating film 64 is preferable to fall within a range of 10 nm to 1000 nm. In the third embodiment, it is formed to have the film thickness of 100 nm.

As the structural materials of the fourth interlayer insulating film 64, it is possible to use a silicon oxide film, a silicon nitride film, a silicon oxynitride film, or the like. In the third embodiment, the silicon oxide film is employed.

Effects and the Like of Third Embodiment

As described above, in the light-modulating element 16 of the third embodiment, the fourth interlayer insulating film 64 as an insulating film is formed on the surfaces of the second transparent electrodes 32 and the third transparent electrodes 33. This makes it possible to avoid contact between the electrophoretic member 50 and the second transparent electrodes 32 as well as the third transparent electrodes 33.

Therefore, such structure can prevent attachment and the like of the electrophoretic particles 51 to the second transparent electrodes 32 and the third transparent electrodes 33, so that it is possible to provide the light-modulating element whose transmittance in the narrow viewing field mode and the wide viewing field mode is stable.

Other structures and steps regarding the manufacturing method thereof are same as the content described in the first and second embodiments, and other operations and effects to be generated are also the same.

Fourth Embodiment

A fourth embodiment of the light-modulating element according to the present invention will be described by referring to FIG. 21. Same reference numerals are to be used for the structural members equivalent to those of the first to third embodiments described above, and explanations thereof are omitted.

Figure 21:
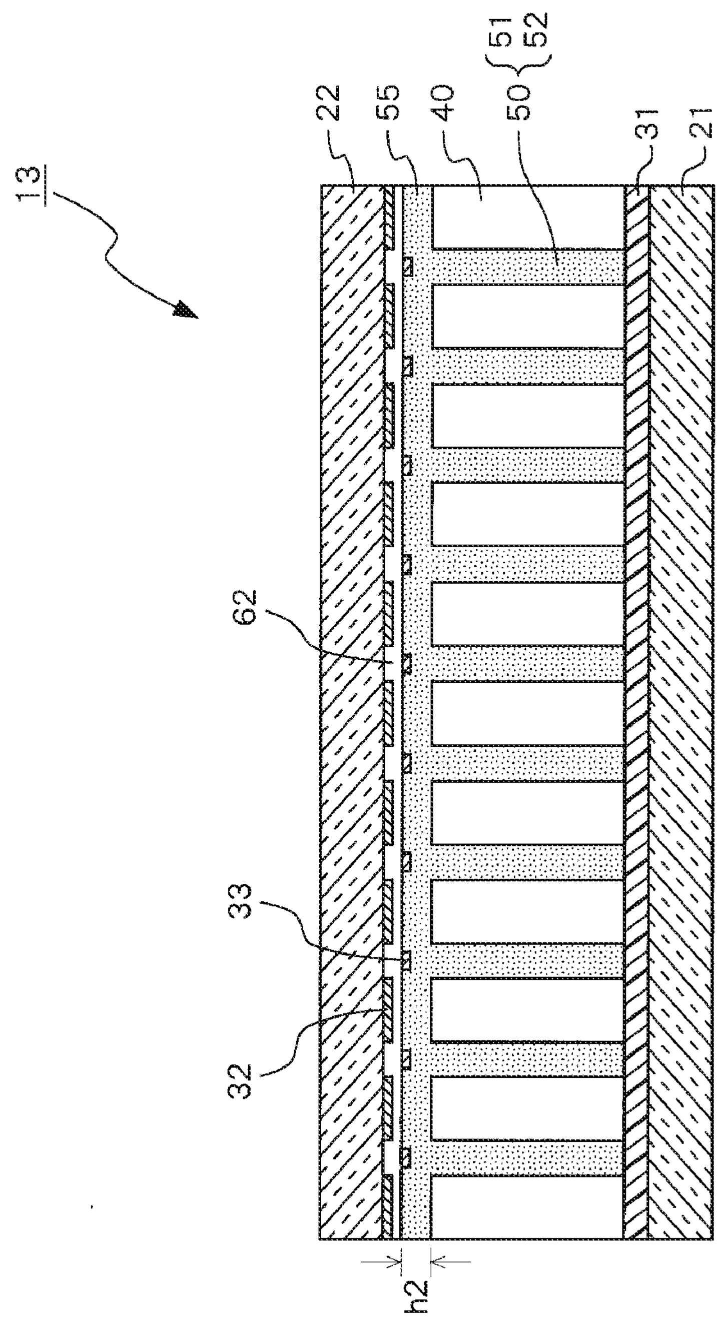
FIG. 21 is a sectional view showing a light-modulating element according to a fourth embodiment of the present invention.

As shown in FIG. 21, a light-modulating element 13 according to the fourth embodiment has a feature in respect that there is a second interlayer insulating film (an on-second-electrode insulating film) 62 disposed at positions partitioning the second transparent electrodes 32 and the third transparent electrodes 33. In this respect, it is different from the first embodiment described above.

More specifically, after disposing only the second transparent electrodes 32 on the surface of the second transparent substrate 22 and forming the second interlayer insulating film 62 on the second transparent substrate 22 where the second transparent electrodes 32 are formed, the third transparent electrodes 33 are disposed at the positions which are on the surface of the second interlayer insulating film 62 and not overlapping with the second transparent electrodes 32 (positions not overlapping in the stacking direction).

In this case, employed is the structure with which a spacer (not shown) which is same as the case of the first embodiment described above is interposed between the second interlayer insulating film 62 and each of the light transmissive regions 40 (see FIG. 19) to keep an isolated distance h2, and a prescribed distance is secured thereby also between the second transparent electrodes 32 and each of the light transmissive regions 40.

The film thickness of the second interlayer insulating film 62 is preferable to fall within a range of 10 nm to 1000 nm. In the fourth embodiment, it is formed to have the film thickness of 100 nm.

As the structural materials of the second interlayer insulating film 62, it is possible to use a silicon oxide film, a silicon nitride film, a silicon oxynitride film, or the like. In the fourth embodiment, the silicon oxide film is employed.

Effects and the Like of Fourth Embodiment

Figure 32:
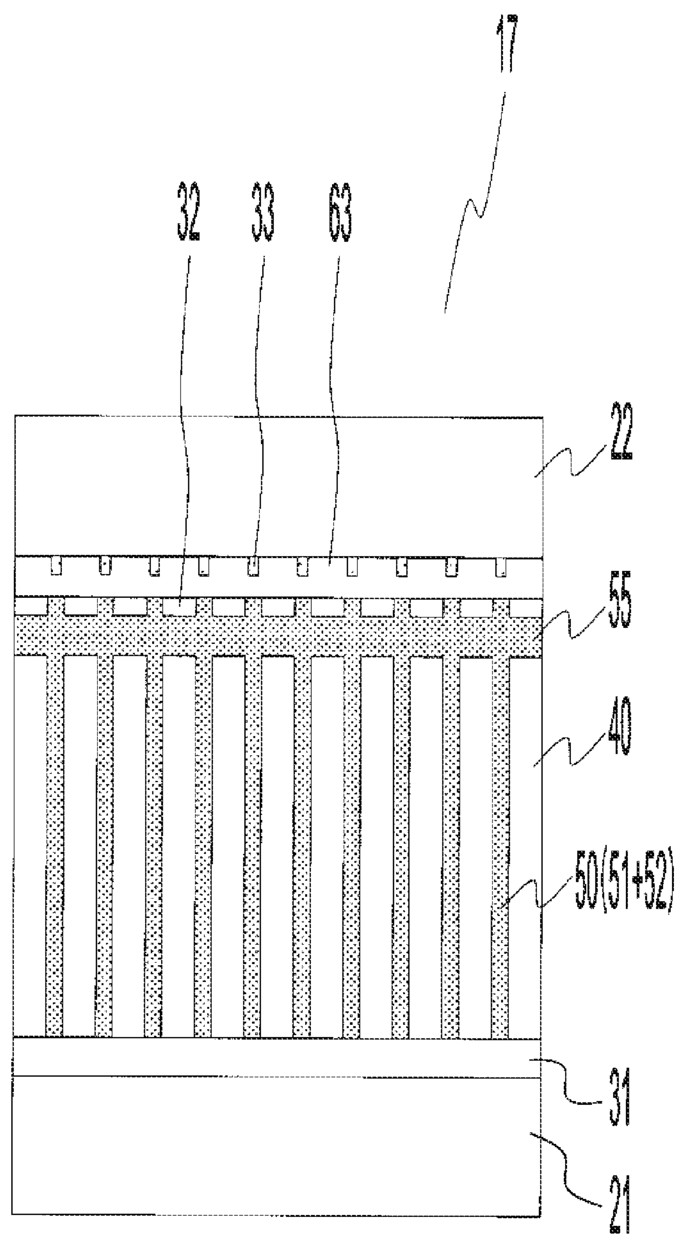
FIG. 32 is a sectional view showing an example of the light-modulating element according to the third embodiment of the present invention.

As described above, the light-modulating element 13 of the fourth embodiment employs the structure with which the second transparent electrodes 32 and the third transparent electrodes 33 are disposed on different layers via the second interlayer insulating film 62, so that insulation between the second transparent electrodes 32 and the third transparent electrodes 33 can be easily secured. Thus, occurrence of operation malfunctions and the like caused by short-circuit between the second transparent electrodes 32 and the third transparent electrodes 33 can be suppressed. As a result, the light-modulating element of the improved operation stability can be provided. As shown in FIG. 32, the same effects can be achieved also with a structure with which the second transparent electrodes 32 are disposed on the air gap 55 side and the third transparent electrodes 33 are disposed on the second transparent substrate 22 side via a third interlayer insulating film 63.

Other structures and steps regarding the manufacturing method thereof are same as the content described in the first embodiment, and other operations and effects to be generated are also the same.

Fifth Embodiment

A fifth embodiment of the light-modulating element according to the present invention will be described by referring to FIG. 22. Same reference numerals are to be used for the structural members equivalent to those of the first to fourth embodiments described above, and explanations thereof are omitted.

Figure 22:
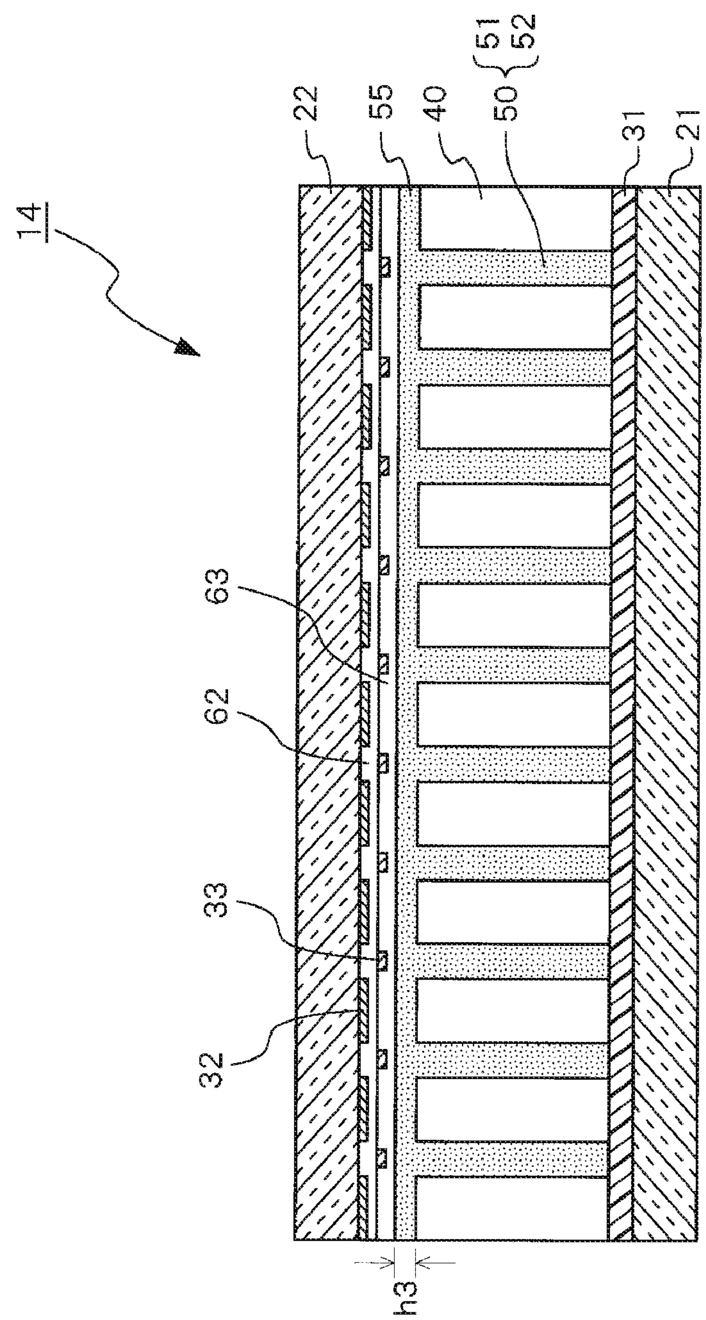
FIG. 22 is a sectional view showing a light-modulating element according to a fifth embodiment of the present invention.

As shown in FIG. 22, a light-modulating element 14 according to the fifth embodiment has a feature in respect that there is a third interlayer insulating film (an on-third-electrode insulating film) 63 disposed further on the surface of the second interlayer insulating film 62 where the third transparent electrodes 33 are formed, in addition to the structure of the fourth embodiment described above.

In this case, employed is the structure with which a spacer (not shown) which is same as the case of the first embodiment described above is interposed between the third interlayer insulating film 63 and each of the light transmissive regions 40 (see FIG. 19) to keep an isolated distance h3, and a prescribed distance is secured thereby also between the second transparent electrodes 32 and each of the light transmissive regions 40.

The film thickness of the third interlayer insulating film 63 is preferable to fall within a range of 10 nm to 1000 nm. In the fifth embodiment, it is formed to have the film thickness of 100 nm. As the structural materials of the third interlayer insulating film 63, it is also possible to use a silicon oxide film, a silicon nitride film, a silicon oxynitride film, or the like as is the case of the second interlayer insulating film 62. In the fifth embodiment, the silicon oxide film is employed.

Effects and the Like of Fifth Embodiment

As described above, the light-modulating element 14 of the fifth embodiment employs the structure with which the third interlayer insulating film is 63 disposed further on the surface of the second interlayer insulating film 62 where the third transparent electrodes 33 are provided. Thus, contact between the electrophoretic members 50 and the third transparent electrodes 33 can be avoided.

That is, with such structure, there is no attachment and the like of the electrophoretic particles 51 to the third transparent electrodes 33. As a result, it becomes possible to provide the light-modulating element in which the stability of the transmittance in the narrow viewing field mode and the wide viewing field mode is improved.

Further, it is also possible to employ a structure with which an insulating film is provided to cover each of the transparent electrodes on the second transparent substrate 22 where the second transparent electrodes 32 and the third transparent electrodes 33 are formed. With such structure, contact between the electrophoretic member 50 and the third transparent electrodes 33 can be prevented, thereby making it possible to avoid attachment of the electrophoretic particles 51 to the third transparent electrodes 33. Therefore, the transmittance stability of the light-modulating element can be improved.

Other structures and steps regarding the manufacturing method thereof are same as the content described in the first or fourth embodiment, and other operations and effects to be generated are also the same.

Sixth Embodiment

A sixth embodiment of the light-modulating element according to the present invention will be described by referring to FIG. 23. Same reference numerals are to be used for the structural members equivalent to those of the first to fifth embodiments described above, and explanations thereof are omitted.

Figure 23:
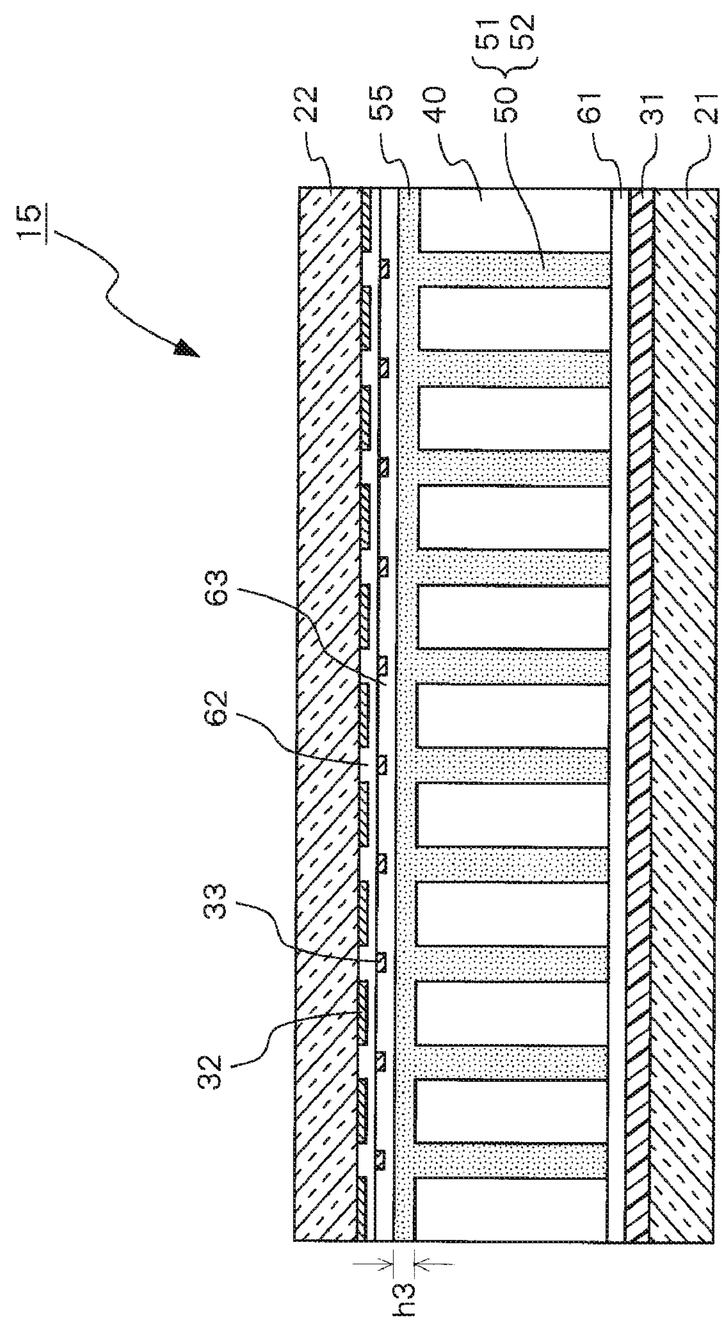
FIG. 23 is a sectional view showing a light-modulating element according to a sixth embodiment of the present invention.

As shown in FIG. 23, a light-modulating element 15 according to the sixth embodiment includes the first interlayer insulating film 61 that is the same structural member as the case of the second embodiment described above disposed between the first transparent electrode 31 and the light transmissive regions 40, in addition to the structure of the fifth embodiment described above.

Therefore, in the sixth embodiment, a silicon oxide film is employed as the structural material of the first interlayer insulating film 61, and it is formed to have the film thickness of 100 nm.

Effects and the Like of Sixth Embodiment

As described above, in the light-modulating element 15 of the sixth embodiment, the first interlayer insulating film 61 as the insulating film is formed between the first transparent electrode 31 and the light transmissive regions 40 in addition to the structure of the fifth embodiment described above. Thus, contact between the electrophoretic members 50 and the first transparent electrodes 31 can also be avoided.

That is, with such structure, not only attachment and the like of the electrophoretic particles 51 to the third transparent electrodes 33 but also attachment and the like of the electrophoretic particles 51 to the first transparent electrode 31 can be prevented. As a result, it becomes possible to improve the transmittance stability comprehensively in the above-described four operations modes (the low-density entire surface light-shielding mode, the high-density entire surface light-shielding mode, the narrow viewing field mode, and the wide viewing field mode).

While FIG. 23 shows the structure based on the fifth embodiment described above, it is also possible to employ a structure with which the first interlayer insulating film 61 is disposed in the above-described manner in addition to the structure (the structure where only the third transparent electrodes 33 are exposed) where the first interlayer insulating film 61 is formed only on the second transparent electrodes 32 as in the case of the second embodiment.

Other structures and steps regarding the manufacturing method thereof are same as the content described in the first to fifth embodiments, and other operations and effects to be generated are also the same.

Seventh Embodiment

A seventh embodiment of the light-modulating element according to the present invention will be described by referring to FIG. 33. Same reference numerals are to be used for the structural members equivalent to those of the first embodiment described above, and explanations thereof are omitted.

Figure 33:
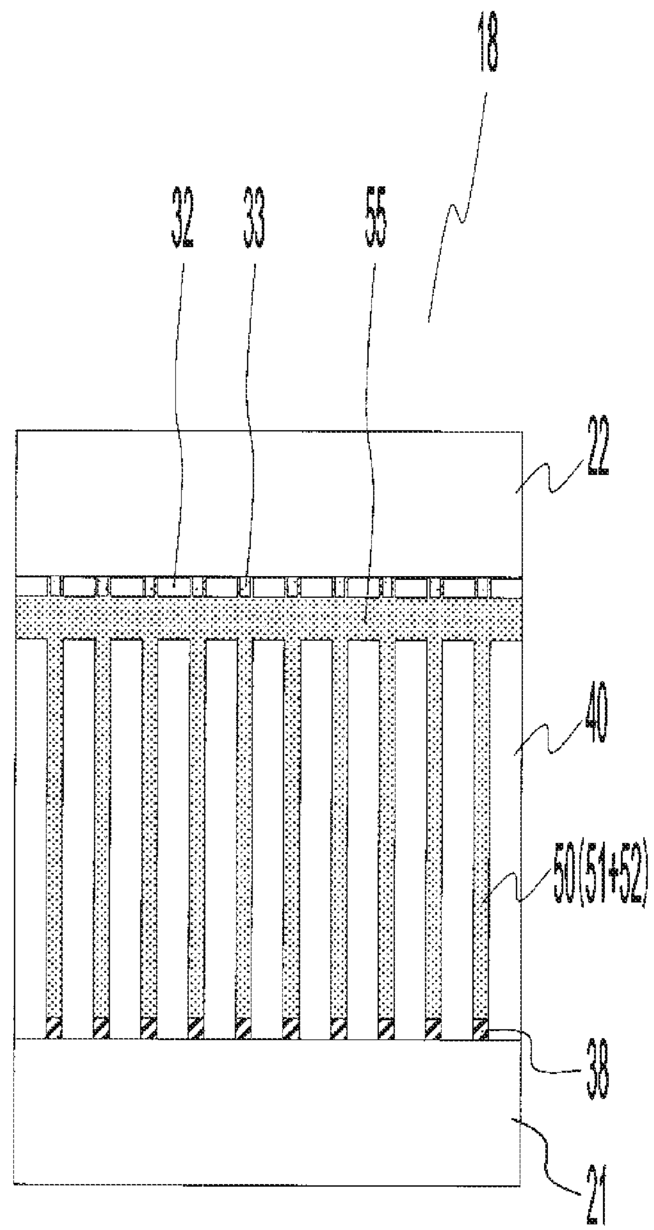
FIG. 33 is a sectional view showing a light-modulating element according to a seventh embodiment of the present invention.

As shown in FIG. 33, a light-modulating element 18 according to the seventh embodiment has a feature in respect that there is a conductive light-shielding pattern 38 disposed on the surface of the first transparent substrate 21. In this respect, it is different from the first embodiment described above.

The film thickness of the conductive light-shielding pattern 38 is preferable to fall within a range of 10 nm to 1000 nm. In the seventh embodiment, it is formed to have the film thickness of 300 nm. As the structural materials of the conductive light-shielding pattern 38, it is possible to preferably employ light-shielding conductive material such as aluminum, chrome, copper, chromium oxide, carbon nanotube, or the like. In the seventh embodiment, aluminum is employed.

Next, a manufacturing method of the light-modulating element 18 according to the seventh embodiment will be described by referring to FIGS. 37A-37F which show each step thereof.

Figures 37A, 37B, 37C, 37D, 37E, 37F:
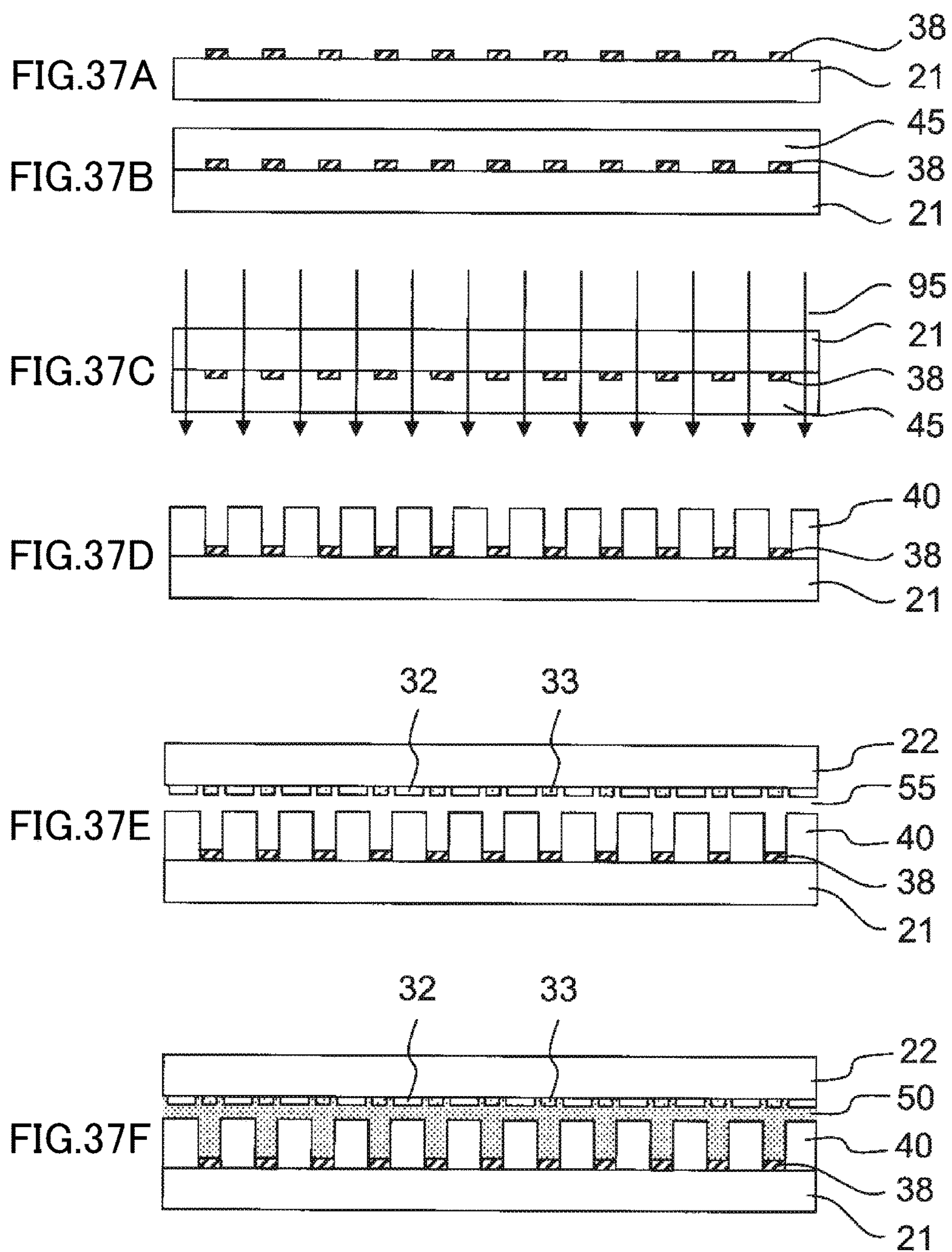
FIGS. 37A-37F show sectional views illustrating the states of each step of a manufacturing method of the light-modulating element disclosed in FIG. 33 in the execution order of FIG. 37A→FIG. 37B→FIG. 37C→FIG. 37D→FIG. 37E→FIG. 37F.

First, as shown in FIG. 37A, the conductive light-shielding pattern 38 is formed on the surface (main face) of the first transparent substrate 21 (a light-shielding pattern forming step). Then, as in FIG. 37B, the transparent photosensitive resin layer 45 is formed as a negative-type photoresist film on the main face side of the first transparent substrate 21 where the conductive light-shielding pattern 38 is formed (a photosensitive resin stacking step). Note that the transparent photosensitive resin layer 45 is a member to become the light transmissive regions 40 through a transmissive region forming step to be described later.

Next, as shown in FIG. 37C, the transparent photosensitive resin layer 45 is exposed by irradiating the exposure light 95 from the first transparent substrate 21 by using the conductive light-shielding pattern 38 as a photomask (an exposure light irradiating step).

Then, through applying development processing on the exposed transparent photosensitive resin layer 45, a plurality of light transmissive regions 40 that are isolated from each other as shown in FIG. 37D are formed (a transmissive region forming step).

Subsequently, as shown in FIG. 37E, the second transparent substrate 22 including the second transparent electrodes 32 and the third transparent electrodes 33 is disposed on the surface of the light transmissive regions 40 via the air gap 55 (a transparent substrate disposing step). The air gap 55 may be provided by disposing a spacer between the light transmissive regions 40 and the second transparent electrodes 32 as well as the third transparent electrodes 33 as in the case of FIG. 19.

Then, as shown in FIG. 37F, the electrophoretic members 50 are filled in the gap formed between the conductive light-shielding pattern 38, the light transmissive regions 40, the second transparent electrodes 32, and the third transparent electrodes 33 (a migration element filling step).

Note here that the light-modulating element 18 shown in FIG. 33 employs a structure which includes the electric field application control module 35 that adjusts the electric field to be applied to the second and third electrodes and the conductive light-shielding pattern (32, 33, and 38) according to signals from outside to change the respective polarities of each of the electrodes (32 and 33) and the conductive light-shielding pattern 38 as in the case of the light-modulating element 11 shown in the first embodiment.

That is, as in the case of the light-modulating element 11 shown in the first embodiment, the electric field application control module 35 may perform switching control of the four operation modes according to the external signals generated by the user operation or the like. Alternatively, it is also possible to employ a structure with which a sensor for detecting the degree of the brightness of natural light or the like is provided and switching control of the operation modes is executed as appropriate according to signals from the sensor.

Effects and the Like of Seventh Embodiment

As described above, in the light-modulating element 18 of the seventh embodiment, the light transmissive regions 40 are directly disposed on the surface of the first transparent substrate 21 without providing the first transparent electrode 31 interposed therebetween. Thus, the transmittance can be increased.

Other structures and steps regarding the manufacturing method thereof are same as the content described in the first embodiment, and other operations and effects to be generated are also the same.

Figure 34:
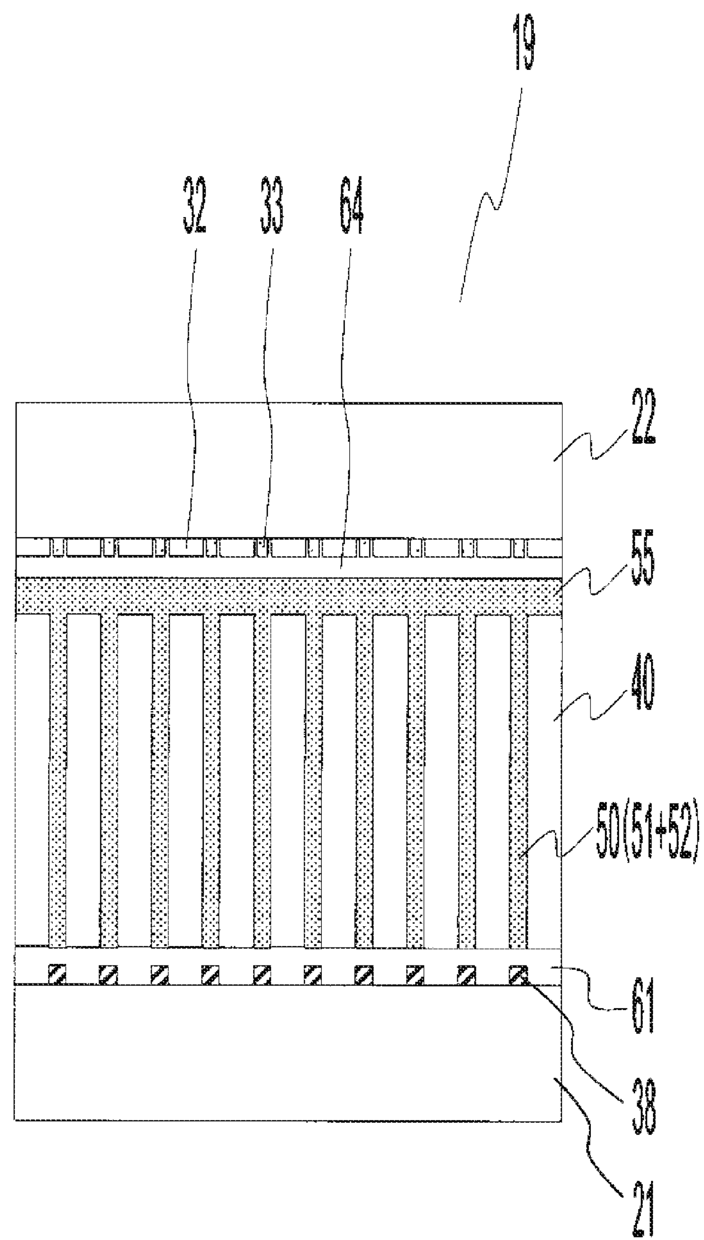
FIG. 34 is a sectional view showing the structure of the light-modulating element according to the seventh embodiment of the present invention in which a first interlayer insulating film is disposed between a first transparent electrode and a light transmissive region and a fourth interlayer insulating film is disposed on the surfaces of second transparent electrodes and third transparent electrodes.

Further, as shown in FIG. 34, in a case where the first interlayer insulating film 61 is disposed between the conductive light-shielding pattern 38 and the light transmissive regions 40 and the fourth interlayer insulating film (the on-second-and-third-electrodes insulating film) 64 is disposed on the surfaces of the second transparent electrodes 32 and the third transparent electrodes 33, the same operations and effects as those of the third embodiment can be acquired.

Figure 35:
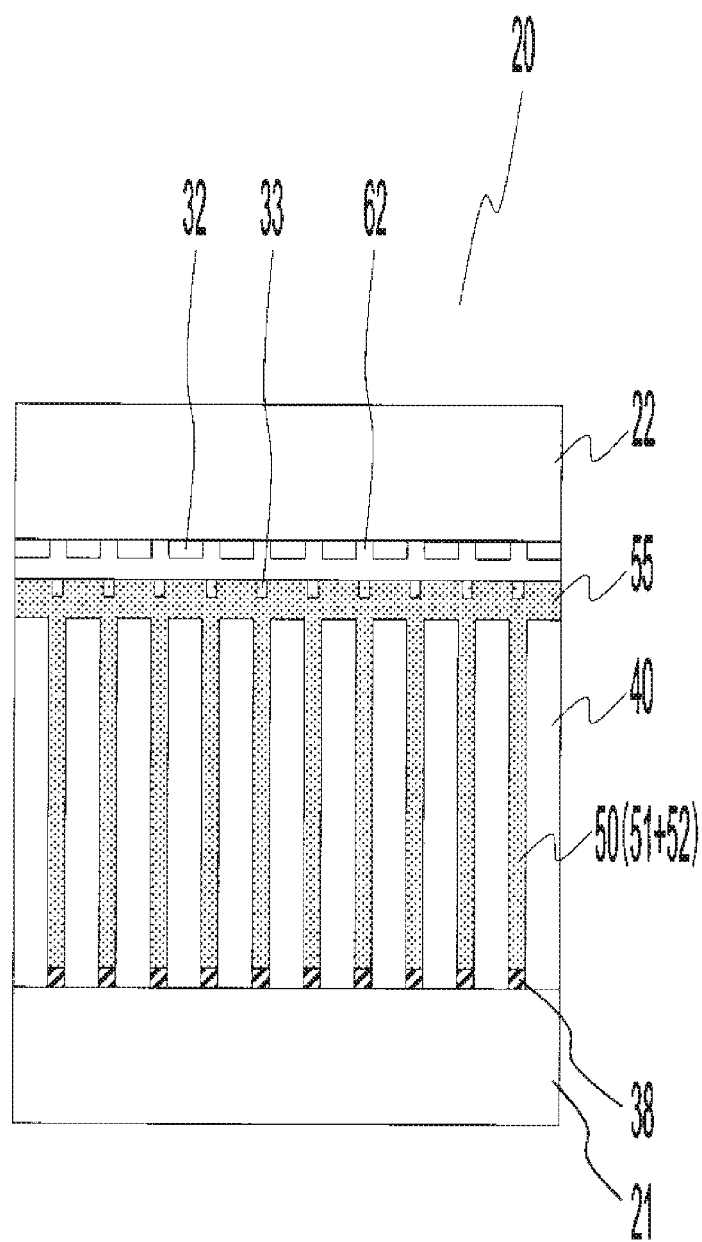
FIG. 35 is a sectional view showing the structure of the light-modulating element according to the seventh embodiment of the present invention in which the second transparent electrodes and the third transparent electrodes are disposed via a second interlayer insulating film.
Figure 36:
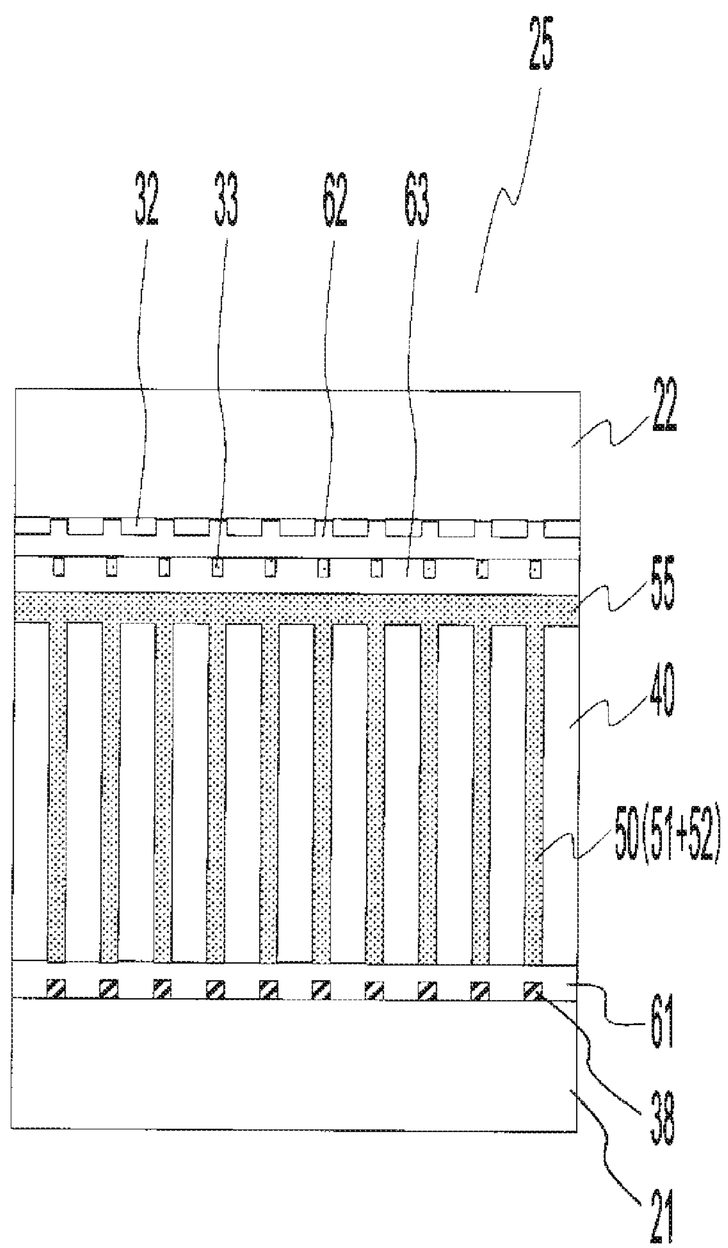
FIG. 36 is a sectional view showing the structure of the light-modulating element according to the seventh embodiment of the present invention in which a third interlayer insulating film is disposed on the surfaces of the second transparent electrodes and the third transparent electrodes disposed via the second interlayer insulating film, and a conductive light-shielding pattern and the light transmissive regions are disposed via the first interlayer insulating film.

Furthermore, as shown in FIG. 35, through disposing the second transparent electrodes 32 and the third transparent electrodes 33 via the second interlayer insulating film (the on-second-electrode insulating film) 62 as in the case of the fourth embodiment, the same operations and effects as those of the fourth embodiment can be acquired. Moreover, as shown in FIG. 36, through disposing the third interlayer insulating film (the on-third-electrode insulating film) 63 on the surfaces of the second transparent electrodes 32 and the third transparent electrodes 33 disposed via the second interlayer insulating film (the on-second-electrode insulating film) 62 and further disposing the conductive light-shielding pattern 38 and the light transmissive regions 40 via the first interlayer insulating film 61 as in the case of the sixth embodiment described above, the same operations and effects as those of the sixth embodiment can be acquired.

Eighth Embodiment

The light-modulating elements according to each of the embodiments of the present invention described above can be applied to a smart glass and the like having a light-modulating function. As the use modes thereof, there may be various kinds such as a mode where it is used by being disposed on one side of the glass, a mode where it is loaded between two glasses, etc.

Thus, an eighth embodiment of the present invention regarding a smart glass that is assumed to have the light-modulating elements (11 to 15) according to each of the embodiments loaded therein will be described by referring to FIG. 24 and FIG. 28. Same reference numerals are to be used for the structural members equivalent to those of the first to seventh embodiments described above, and explanations thereof are omitted.

Further, while FIG. 24 to FIG. 28 illustrate the smart glass on which the light-modulating element 11 according to the above-described first embodiment is loaded, it is also possible to employ each of the light-modulating elements (12 to 20 and the like) according to the other embodiments instead of the light-modulating element 11.

(Structure of Loading Element on One Side of Glass)

First, a smart glass in a mode of pasting the light-modulating element 11 on one side of the glass will be described by referring to FIG. 24 and FIG. 25.

Figure 24:
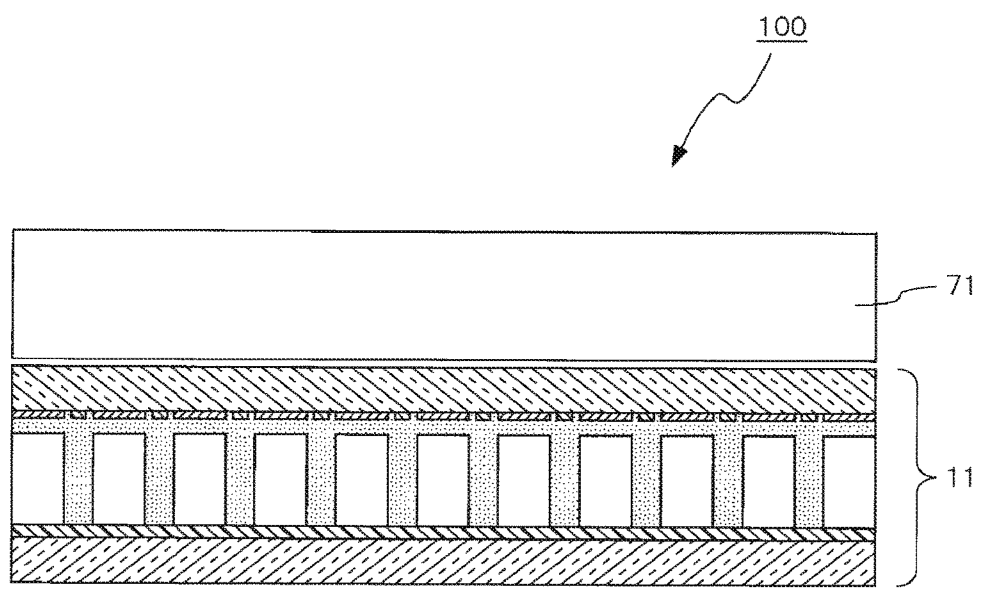
FIG. 24 is a sectional view showing the structure of a smart glass according to an eighth embodiment of the present invention including the light-modulating element disclosed in FIG. 1 and the like provided on one face of a glass.

As shown in FIG. 24, the smart glass 100 provided with a light-modulating function is formed with a glass 71 and the light-modulating element 11 disposed on one side of the glass 71. Note here that the glass 71 is float glass used in general as window glass, which exhibits a light-shielding characteristic.

As described in the first embodiment, the light-shielding element 11 can achieve the four operation modes such as the low-density entire surface light-shielding mode, the high-density entire surface light-shielding mode, the narrow viewing field mode, and the wide viewing field mode.

Therefore, with the smart glass 100 including the light-modulating element 11 loaded on one face thereof, significant light-modulating control according to the surrounding environments can be performed through switching the four operation modes as appropriate.

Specifically, when the light-modulating element 11 is set to the wide viewing field mode, the light-transmitting characteristic is secured to all the direction of the outside. When the light-modulating element 11 is set to the narrow viewing field mode, the light-transmitting characteristic is secured only in the front direction and the light-shielding characteristic is exhibited in the oblique directions.

Further, when the light-modulating element 11 is set to the high-density light-shielding mode, a high-density light-shielding characteristic is secured for all the directions of outside. Meanwhile, when the light-modulating element 11 is set to the low-density entire surface light-shielding mode, the front direction comes to be slightly dark while the oblique directions come to be extremely dark.

For example, the wide viewing field mode is preferable in a case where a wide range of viewing field through the glass is desired to be secured. Meanwhile, the narrow viewing field mode is preferable in a case where the viewing field in the front direction is desired to be secured while shielding the incident light from the upper oblique directions such as the sunlight.

Further, the low-density entire surface light-shielding mode is preferable in a case where the viewing field from outside is desired to be shielded while the viewing field from the inside to the outside is desired to be secured to some extent under a condition where the outside is brighter than the inside of the glass such as in the daytime. The high-density entire surface light-shielding mode is preferable in a case where the viewing field through the glass is desired to be shielded completely.

As described, it is possible with the smart glass 100 to select and achieve the four kinds of light-modulating states based on the four operation modes of the light-modulating element 11 according to the request from the user.

Further, in a case where the smart glass 100 is disposed with the glass 71 facing the open-air side, a function of absorbing and shielding UV light may be given to the glass 71.

Figure 25:
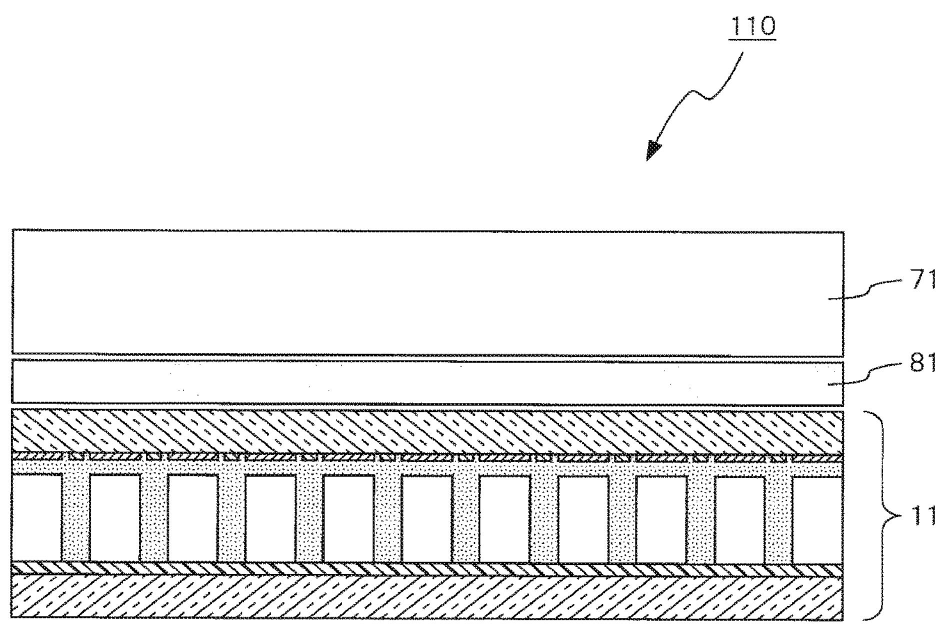
FIG. 25 is a sectional view showing the structure of a smart glass including a UV cut film provided between the light-modulating element and the glass disclosed in FIG. 24.

Furthermore, as a smart glass 110 shown in FIG. 25, it is also possible to employ a structure with which a UV cut film 81 is disposed between the glass 71 and the light-modulating element 11. As described, through employing the structure where the function of reflecting or absorbing ultraviolet rays is added, deterioration in the operation state of the light-modulating element 11 caused by the influence of the light can be decreased. Therefore, a smart glass of still higher operation reliability can be provided.

Further, a hard coat layer for preventing scars and an antireflection layer for preventing glare of the sunlight may be formed on the surface of the light-modulating element 11.

(Structure of Disposing Element Between Two Glasses)

Next, a smart glass in a mode where the light-modulating element 11 is used by being disposed between two pieces of glass will be described by referring to FIG. 26 to FIG. 28.

Figure 26:
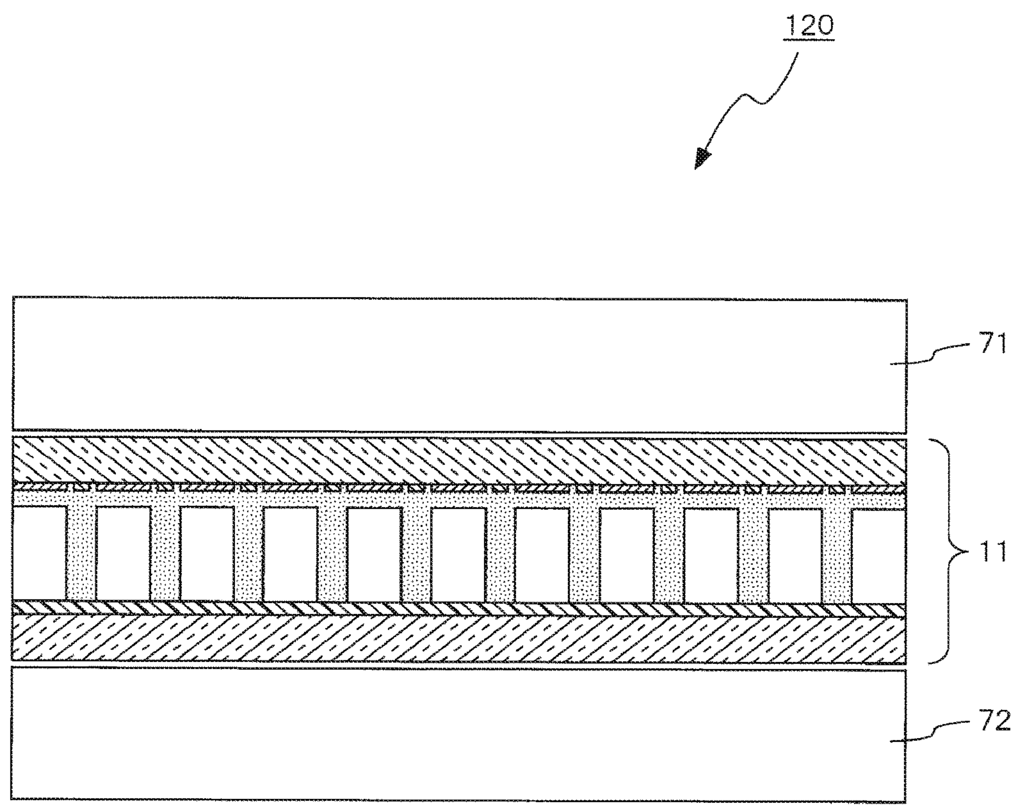
FIG. 26 is a sectional view showing the structure of the smart glass according to the eighth embodiment of the present invention including the light-modulating element disclosed in FIG. 1 and the like provided between two glasses.

As shown in FIG. 26, a smart glass 120 is formed with a first glass 71, a second glass 72, and the light-modulating element 11 provided between those two glasses. Note here that the first glass 71 and the second glass 72 are float glass used in general as window glass, and each of those exhibits a light-transmitting characteristic.

As described, with the smart glass 120 including the light-modulating element 11 capable of achieving the four operation modes loaded between the two glasses, significant light-modulating control according to the surrounding environments can be performed.

Further, the smart glass 120 is structured to cover the both faces of the light-modulating element 11 with the glass. Thus, there is a little possibility of physically damaging the light-modulating element 11 and the airtightness for the light-modulating element 11 is increased at the same time. Therefore, operations of still higher reliability can be achieved.

In addition, the smart glass 120 may be disposed with the first glass 71 facing the side where more light makes incident, and a glass provided with a function of shielding UV light may be used as the first glass 71.

Figure 27:
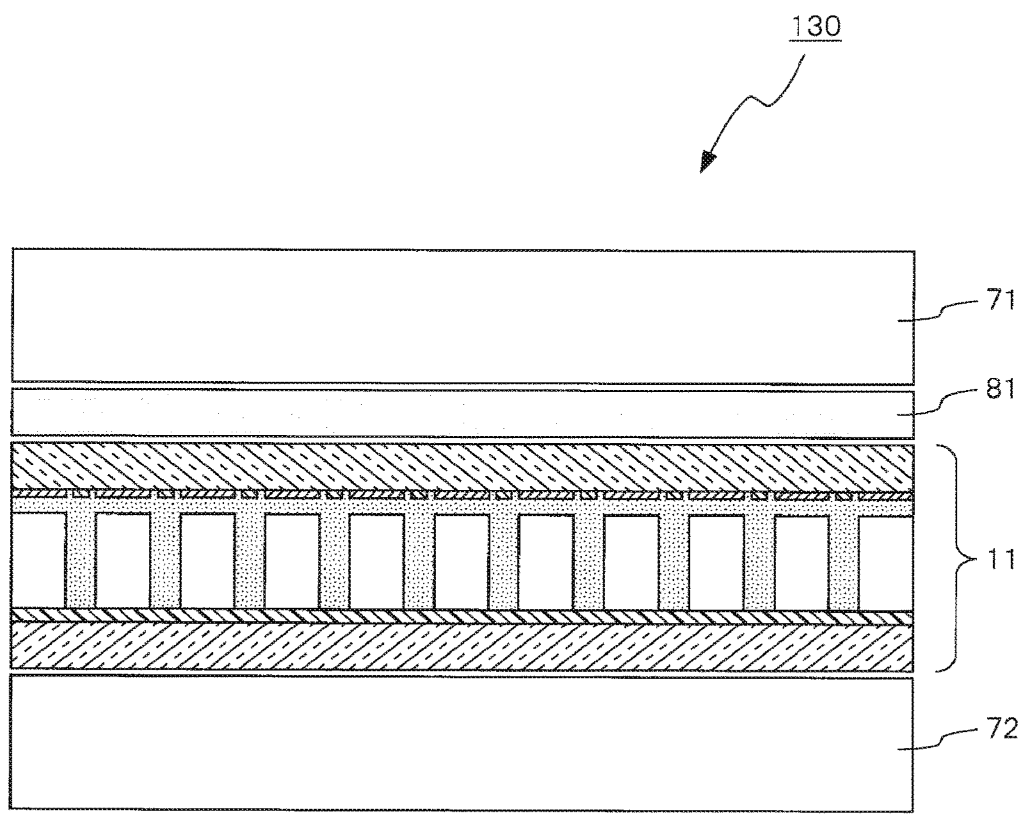
FIG. 27 is a sectional view showing the structure of the smart glass including a UV cut film provided between the light-modulating element and the glass on the side where more light makes incident in the structure disclosed in FIG. 26.

Further, like a smart glass 130 shown in FIG. 27, it is also possible to employ a structure where the UV cut film 81 is disposed between the first glass 71 and the light-modulating element 11. In such case, it is preferable to employ a structure where the UV cut film 81 is disposed on the side of the glass where more light makes incident (herein, assumed is a case where the first glass 71 is the light-entering side glass and the second glass 72 is the light-exit side glass).

As described, deterioration in the operations of the light-modulating element 11 caused by light can be decreased through employing the structure to which the function of shielding ultraviolet rays is added. Therefore, a smart glass with still higher operation reliability can be provided.

Figure 28:
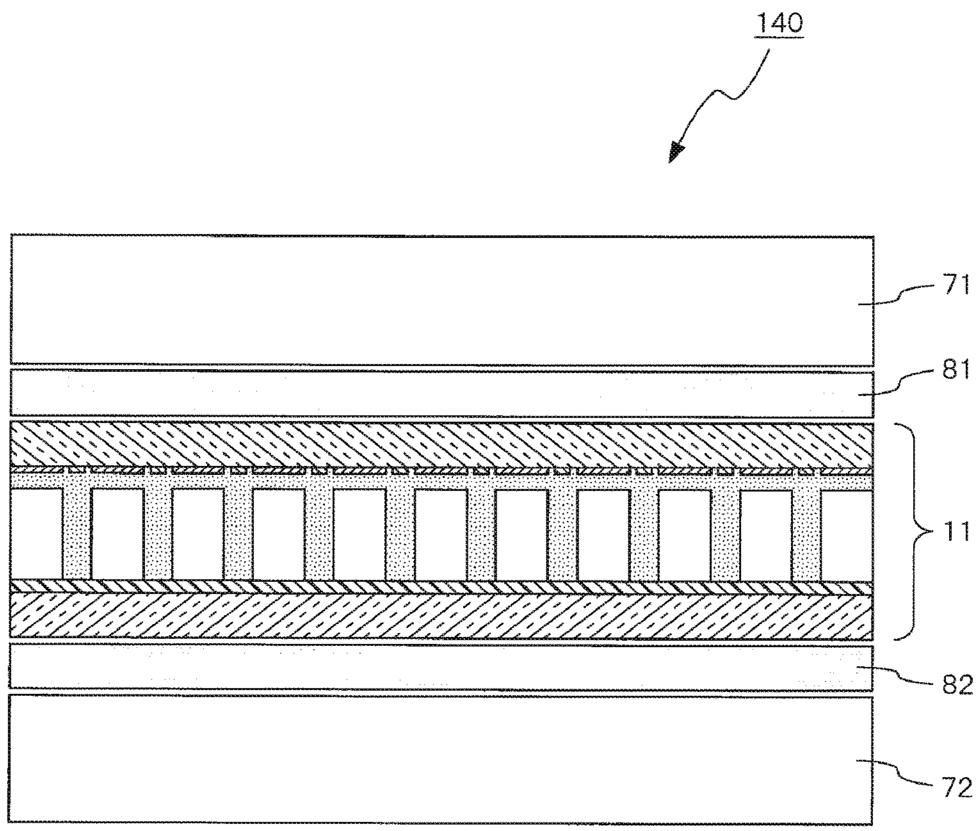
FIG. 28 is a sectional view showing the structure of the smart glass including a UV cut film provided between the light-modulating element and each of the two glasses in the structure disclosed in FIG. 26.
Figure 29A:
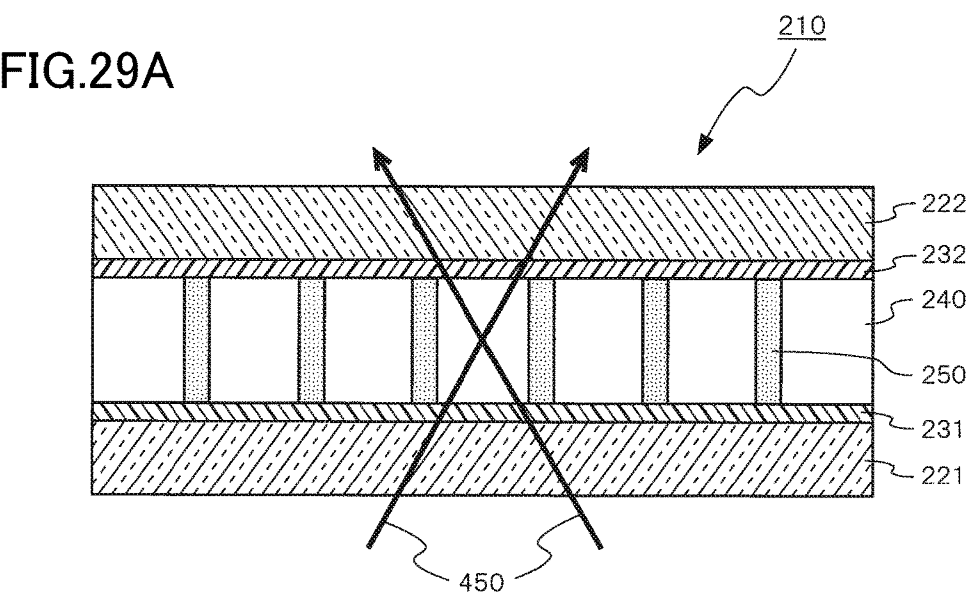
Figure 29B:
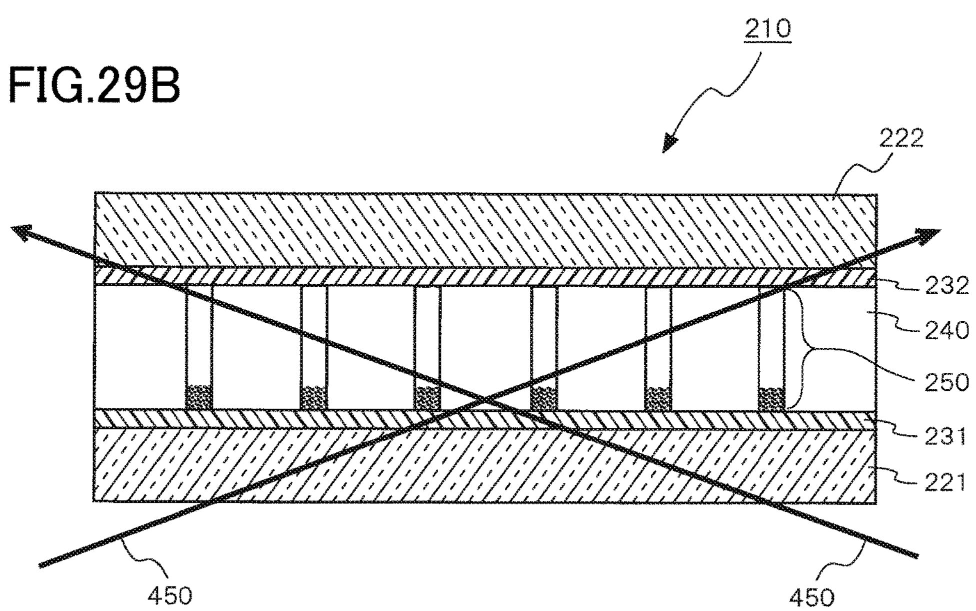
Figure 30:
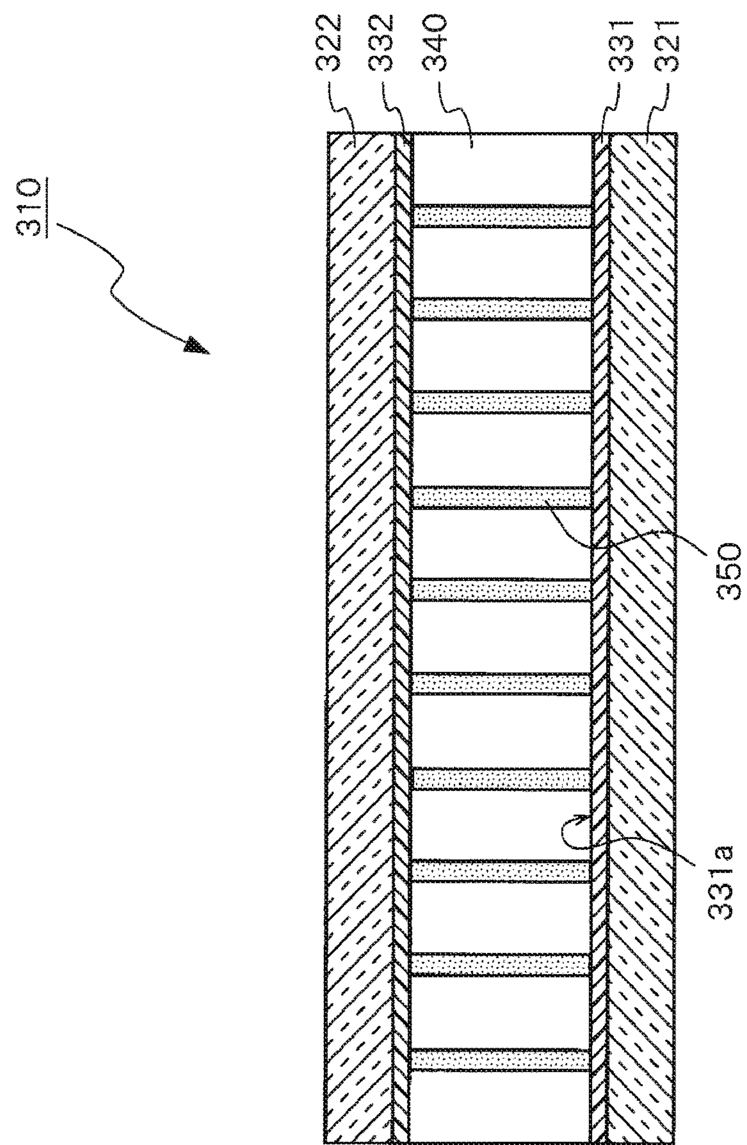
FIG. 30 is a sectional view showing an example of a light-ray direction control element according to a related technique.

Further, like a smart glass 140 shown in FIG. 28, it is also possible to employ a structure where the UV cut film 81 is disposed between the first glass 71 and the light-modulating element 11, and another UV cut film 82 is disposed between the second glass 72 and the light-modulating element 11.

Such structure makes it possible to further decrease deterioration in the operations of the light-modulating element 11 caused by light, so that the operation reliability of the smart glass can be improved further.

Each of the above-described embodiments shows preferable concrete examples of the light-modulating element and the smart glass, and there may be various kinds of technically preferable limits set thereon. However, the scope of technical spirits of the present invention is not limited only to those unless there is a specific remark made to limit the present invention.

While new technical content regarding the embodiments described above can be summarized as follows, it is to be noted that the present invention is not necessarily limited to those.

(Supplementary Note 1)

A Light-modulating element, which includes: a first transparent substrate 21; a second transparent substrate 22 counter-disposed at a position distant from the first transparent substrate 21; a first transparent electrode 31 disposed on a surface of the first transparent substrate 21 opposing to the second transparent substrate 22; and a plurality of light transmissive regions 40 disposed to be isolated from each other between the first transparent electrode 31 and the second transparent substrate 22, the light-modulating element including:

a plurality of second transparent electrodes 32 disposed on the second transparent substrate 22 at positions opposing to each of the light transmissive regions 40 with a prescribed distance provided from each of the light transmissive regions 40;

a plurality of third transparent electrodes 33 that are individually disposed between each of the second transparent electrodes 32 on the second transparent substrate 22 side with a prescribed distance provided therebetween; and an electrophoretic member 50 containing light-shielding electrophoretic particles 51 disposed in an air gap 55 formed between each of the second transparent electrodes 32, each of the third transparent electrodes 33, and each of the light transmissive regions 40.

(Supplementary Note 2)

The light-modulating element as depicted in Supplementary Note 1, wherein:

an on-first-electrode insulating film 61 is disposed on a surface of the first transparent electrode 31; and each of the light transmissive regions 40 is disposed on the on-first-electrode insulating film 61.

(Supplementary Note 3)

The light-modulating element as depicted in Supplementary Note 1 or 2, wherein:

an on-second-electrode insulating film 62 is disposed on the second transparent substrate 22 by covering the second transparent electrodes 32; and the third transparent electrodes 33 are disposed on the on-second-electrode insulating film 62.

(Supplementary Note 4)

The light-modulating element as depicted in Supplementary Note 3, wherein an on-third-electrode insulating film 63 is disposed on the on-second-electrode insulating film 62 by covering the third transparent electrodes 33.

(Supplementary Note 5)

The light-modulating element as depicted in any one of Supplementary Notes 1 to 4, which includes a spacer 56 as a member for keeping the prescribed distance provided between the light transmissive regions 40 and the second transparent electrodes 32.

(Supplementary Note 6)

The light-modulating element as depicted in any one of Supplementary Notes 1 to 5, which includes an electric field application control module 35 which adjusts an electric field applied to the first, second, and third transparent electrodes (31, 32, 33) according to a signal from outside to change polarities of each of the transparent electrodes (31, 32, 33).

(Supplementary Note 7: High-Density Entire Surface Light-Shielding Mode)

The light-modulating element as depicted in Supplementary Note 6, wherein the electric field apply control module 35 sets the relative potential of the third transparent electrodes 33 with respect to the first transparent electrode 31 to be of the opposite polarity from that of the surface charge of the electrophoretic particles 51 and sets the second transparent electrodes 32 and the third transparent electrodes 33 to be of the same potential to dispose the electrophoretic particles 51 in the vicinity of the second transparent substrate 22.

(Supplementary Note 8: Narrow Viewing Field Mode)

The light-modulating element as depicted in Supplementary Note 6 or 7, wherein electric field application control module 35 sets the first transparent electrode 31 and the third transparent electrodes 33 to be of the same potential and sets the relative potential of the second transparent electrodes 32 with respect to the third transparent electrodes 33 to be of the same polarity with that of the surface charge of the electrophoretic particles 51 to dispose the electrophoretic particles 51 in the regions excluding the air gap 55A between the second transparent electrodes 32 and each of the light transmissive regions 40 (entire regions from the first electrode 31 to the third transparent electrodes 33 between each of the light transmissive regions 41 in the regions along the stacking direction where the third transparent electrodes 33 are disposed).

(Supplementary Note 9: Wide Viewing Field Mode)

The light-modulating element as depicted in any one of Supplementary Notes 6 to 8, wherein the electric field application control module 35 sets the relative potential of the third transparent electrode 33 with respect to the first transparent electrode 31 to be of the same polarity as the surface charge of the electrophoretic particles 51 and sets the second transparent electrode 32 and the third transparent electrode 33 to be of the same potential to dispose the electrophoretic particles 51 in the vicinity of the first transparent electrode 31.

(Supplementary Note 10: Low-Density Entire Surface Light-Shielding Mode)

The light-modulating element as depicted in any one of Supplementary Notes 6 to 9, wherein the electric field application control module 35 sets the first transparent electrode 31, the second transparent electrodes 32, and the third transparent electrodes 33 to be of a same potential to dispose the electrophoretic particles 51 in the whole regions within the air gap 55 where the electrophoretic member 50 is disposed.

(Supplementary Note 11)

A smart glass which includes: a glass 71 exhibiting a light-transmitting characteristic; and the light-modulating element as depicted in any one of Supplementary Notes 1 to 10 disposed on a surface of the glass 71.

(Supplementary Note 12)

A smart glass which includes:

a first glass 71 exhibiting a light-transmitting characteristic;

a second glass 72 exhibiting a light-transmitting characteristic disposed in opposition to the first glass 71; and the light-modulating element as depicted in any one of Supplementary Notes 1 to 10 disposed between the first glass 71 and the second glass 72.

(Supplementary Note 13)

A Light-modulating element which includes: a first transparent substrate; a second transparent substrate counter-disposed at a position distant from the first transparent substrate; a conductive light-shielding pattern disposed on a surface of the first transparent substrate opposing to the second transparent substrate;

and a plurality of light transmissive regions disposed to be isolated from each other between the conductive light-shielding pattern and the second transparent substrate, the light-modulating element including:

a plurality of second transparent electrodes disposed on the second transparent substrate at positions opposing to each of the light transmissive regions with a prescribed distance provided from each of the light transmissive regions;

a plurality of third transparent electrodes that are individually disposed between each of the second transparent electrodes on the second transparent substrate side with a prescribed distance provided therebetween; and an electrophoretic member containing light-shielding electrophoretic particles disposed in an air gap formed between each of the second transparent electrodes, each of the third transparent electrodes, and each of the light transmissive regions.

(Supplementary Note 14)

The light-modulating element as depicted in Supplementary Note 13, wherein:

a first interlayer insulating film is disposed on a surface of the conductive light-shielding film; and each of the light transmissive regions is disposed on the first interlayer insulating film.

(Supplementary Note 15)

The light-modulating element as depicted in Supplementary Note 13 or 14, wherein:

an on-second-electrode insulating film is disposed on the second transparent substrate by covering the second transparent electrodes; and the third transparent electrodes are disposed on the on-second-electrode insulating film.

(Supplementary Note 16)

The light-modulating element as depicted in Supplementary Note 15, wherein an on-third-electrode insulating film is disposed on the on-second-electrode insulating film by covering the third transparent electrodes.

(Supplementary Note 17)

The light-modulating element as depicted in any one of Supplementary Notes 13 to 16, which includes a spacer as a member for keeping the prescribed distance provided between the light transmissive regions and the second transparent electrodes.

(Supplementary Note 18)

The light-modulating element as depicted in any one of Supplementary Notes 13 to 17, which includes an electric field application control module which adjusts an electric field applied to the second and third transparent electrodes as well as the conductive light-shielding pattern according to a signal from outside to change polarities of each of the transparent electrodes.

This Application claims the Priority right based on Japanese Patent Application No. 2014-054761 filed on Mar. 18, 2014 and the disclosure thereof is hereby incorporated by reference in its entirety.

INDUSTRIAL APPLICABILITY

The present invention can be utilized broadly for various kinds of devices and the like related to controlling the range of exit directions of transmitted light and the transmittance. For example, it can be utilized as an element for light modulation used for a smart glass and the like.

REFERENCE NUMERALS

11, 12, 13, 14, 15, 16, 17, 18, 19, 20 Light-modulating element
21 First transparent substrate
22 Second transparent substrate
25 Light-modulating element
31 First transparent electrode
32 Second transparent electrode
33 Third transparent electrode
35 Electric field application control module
38 Conductive light-shielding pattern
40 Light transmissive region
40*a* Width of second transparent electrode
40*b* Width of third transparent electrode
45 Transparent photosensitive resin layer (photoresist film)
50 Electrophoretic member (electrophoretic element)
51 Electrophoretic particle
52 Dispersant
55 Air gap
55A Gap
56 Spacer
61 First interlayer insulating film (on-first-electrode insulating film)
62 Second interlayer insulating film (on-second-electrode insulating film)
63 Third interlayer insulating film (on-third-electrode insulating film)
64 Fourth interlayer insulating film (on-second-and-third-electrodes insulating film)
71 First glass (glass, light-entering side glass)
72 Second glass (light-exit side glass)
81 UV cut film
82 Another UV cut film
90 Photomask
91 Mask pattern
95 Exposure light
100, 110, 120, 130 Smart glass
210, 310 Light-ray direction control element
221, 222, 321 Transparent substrate
322 Another transparent substrate
231, 232, 331 Transparent conductive film
332 Another transparent conductive film
240, 340 Light transmissive region
250, 350 Electrophoretic element
450 Light (incident light)

The invention claimed is:

1. A light-modulating element, comprising:

a first transparent substrate;

a second transparent substrate counter-disposed at a position distant from the first transparent substrate;

a first transparent electrode disposed on a surface of the first transparent substrate opposing to the second transparent substrate; and a plurality of light transmissive regions disposed such that the plurality of light transmissive regions are isolated from each other between the first transparent electrode and the second transparent substrate, the light-modulating element further comprising:

a plurality of second transparent electrodes disposed on the second transparent substrate at positions opposing to each of the light transmissive regions with a prescribed distance provided from each of the light transmissive regions;

a plurality of third transparent electrodes that are individually disposed between each of the second transparent electrodes on the second transparent substrate with a prescribed distance provided therebetween;

an electrophoretic member comprising light-shielding electrophoretic particles disposed in an air gap formed between each of the second transparent electrodes, each of the third transparent electrodes, and each of the light transmissive regions; and an electric field application control module which adjusts an electric field applied to the first transparent electrodes, the second transparent electrodes, and the third transparent electrodes according to a received signal, such that the electric field application control module is configured to change polarities of each of the first transparent electrodes, the second transparent electrodes, and the third transparent electrodes, wherein the electric field application control module is configured to adjust the electric field applied to the first transparent electrodes, the second transparent electrodes, and the third transparent electrodes to thereby enable:

a low-density entire surface light-shielding mode in which the first transparent electrodes, the second transparent electrodes, and the third transparent electrodes have a same potential;

a high-density entire surface light-shielding mode in which the second transparent electrodes and the third transparent electrodes have a same potential and a relative potential of the second transparent electrodes and the third transparent electrodes with respect to the first transparent electrodes is of a same polarity as a surface charge of the electrophoretic particles.

2. The light-modulating element as claimed in claim 1, further comprising:

an on-first-electrode insulating film disposed on a surface of the first transparent electrode;

wherein each of the light transmissive regions is disposed on the on-first-electrode insulating film.

3. The light-modulating element as claimed in claim 1, further comprising:

an on-second-electrode insulating film disposed on the second transparent substrate and covering the second transparent electrodes;

wherein the third transparent electrodes are disposed on the on-second-electrode insulating film.

4. The light-modulating element as claimed in claim 3, further comprising an on-third-electrode insulating film is disposed on the on-second-electrode insulating film and covering the third transparent electrodes.

5. The light-modulating element as claimed in claim 1, further comprising a spacer as a member configured to maintain the prescribed distance provided between the light transmissive regions and the second transparent electrodes.

6. A light-modulating element, comprising:

a first transparent substrate;

a second transparent substrate counter-disposed at a position distant from the first transparent substrate;

a conductive light-shielding pattern disposed on a surface of the first transparent substrate opposing to the second transparent substrate;

a plurality of light transmissive regions disposed such that the plurality of light transmissive regions are isolated from each other between the conductive light-shielding pattern and the second transparent substrate, the light-modulating element further comprising:

a plurality of second transparent electrodes disposed on the second transparent substrate at positions opposing to each of the light transmissive regions with a prescribed distance provided from each of the light transmissive regions;

a plurality of third transparent electrodes that are individually disposed between each of the second transparent electrodes on the second transparent substrate side with a prescribed distance provided therebetween;

an electrophoretic member comprising light-shielding electrophoretic particles disposed in an air gap formed between each of the second transparent electrodes, each of the third transparent electrodes, and each of the light transmissive regions; and an electric field application control module which adjusts an electric field applied to the conducting light-shielding pattern, the second transparent electrodes, and the third transparent electrodes according to a received signal, such that the electric field application control module is configured to change polarities of each of the conductive light-shielding pattern, the second transparent electrodes, and the third transparent electrodes, wherein the electric field application control module is configured to adjust the electric field applied to the conductive light-shielding pattern, the second transparent electrodes, and the third transparent electrodes to thereby enable:

a low-density entire surface light-shielding mode in which the conductive light-shielding pattern, the second transparent electrodes, and the third transparent electrodes have a same potential;

a high-density entire surface light-shielding mode in which the second transparent electrodes and the third transparent electrodes have a same potential a relative potential of the second transparent electrodes and the third transparent electrodes with respect to the conductive light-shielding pattern is of an opposite polarity as a surface charge of the electrophoretic particles;

a narrow viewing field mode in which the conductive light-shielding pattern and the third transparent electrodes have a same potential and a relative potential of the conductive light-shielding pattern and the third transparent electrodes with respect to the second transparent electrodes is of an opposite polarity as the surface charge of the electrophoretic particles; and a wide viewing field mode in which the second transparent electrodes and the third transparent electrodes have a same potential and a relative potential of the second transparent electrodes and the third transparent electrodes with respect to the conductive light-shielding pattern is of a same polarity as the surface charge of the electrophoretic particles.

7. The light-modulating element as claimed in claim 6, further comprising:

a first interlayer insulating film disposed on a surface of the conductive light-shielding pattern;

wherein each of the light transmissive regions is disposed on the first interlayer insulating film.

8. The light-modulating element as claimed in claim 6, further comprising:

an on-second-electrode insulating film disposed on the second transparent substrate and covering the second transparent electrodes;

wherein the third transparent electrodes are disposed on the on-second-electrode insulating film.

9. The light-modulating element as claimed in claim 8, further comprising an on-third-electrode insulating film is disposed on the on-second-electrode insulating film and covering the third transparent electrodes.

10. The light-modulating element as claimed in claim 6, further comprising a spacer configured to maintain the prescribed distance provided between the light transmissive regions and the second transparent electrodes.

11. A smart glass, comprising: a glass exhibiting a light-transmitting characteristic; and the light-modulating element as claimed in claim 1 disposed on a surface of the glass.

12. A smart glass, comprising:

a first glass exhibiting a light-transmitting characteristic;

a second glass exhibiting a light-transmitting characteristic disposed in opposition to the first glass; and the light-modulating element as claimed in claim 1 disposed between the first glass and the second glass.

* * * * *